(12) United States Patent
Bosch et al.

(10) Patent No.: US 7,292,876 B2
(45) Date of Patent: Nov. 6, 2007

(54) DIGITAL SYSTEM BUS FOR USE IN LOW POWER INSTRUMENTS SUCH AS HEARING AIDS AND LISTENING DEVICES

(75) Inventors: Jozef J. G. Bosch, Amsterdam (NL); Paulus Spaanderman, Leiden (NL); Jens K. Poulsen, Hedehusene (DK); Mohammad Shajaan, Valby (DK)

(73) Assignee: Sonion Nederland B.V., Amsterdam (NL)

( * ) Notice: Subject to any disclaimer, the term of this patent is extended or adjusted under 35 U.S.C. 154(b) by 265 days.

(21) Appl. No.: 10/679,002

(22) Filed: Oct. 3, 2003

(65) Prior Publication Data
US 2004/0116151 A1   Jun. 17, 2004

(51) Int. Cl.
*H04M 1/00*   (2006.01)
(52) U.S. Cl. .............................. 455/556.1; 455/556.2; 455/550.1
(58) Field of Classification Search ............. 455/550.1, 455/556.1, 3.06, 556.2; 348/312, 98; 710/107; 235/379; 386/98
See application file for complete search history.

(56) References Cited

U.S. PATENT DOCUMENTS

| | | | |
|---|---|---|---|
| 5,724,360 A | | 3/1998 | Lundh et al. |
| 6,049,894 A | * | 4/2000 | Gates .......................... 714/41 |
| 6,144,748 A | * | 11/2000 | Kerns .......................... 381/312 |
| 6,738,844 B2 | * | 5/2004 | Muljono et al. ............. 710/107 |
| 6,744,975 B1 | * | 6/2004 | Kimura ........................ 386/98 |
| 6,968,995 B1 | * | 11/2005 | Yamamoto et al. ......... 235/379 |
| 2002/0054684 A1 | | 5/2002 | Menzl |
| 2003/0134590 A1 | * | 7/2003 | Suda et al. ................. 455/3.06 |
| 2003/0206237 A1 | * | 11/2003 | Imaizumi ..................... 348/312 |

FOREIGN PATENT DOCUMENTS

| | | |
|---|---|---|
| WO | WO 00/47017 | 8/2000 |
| WO | WO 02/35807 | 5/2002 |

OTHER PUBLICATIONS

"Simple I2C Interface For PCS" *Electronics World* (Including Wireless World), Reed Business Publishing, Sutton, Surrey, May 1, 1995, p. 431.
Search Report for International Application No. PCT/EP03/11247, dated Mar. 24, 2004; 3 pages.

\* cited by examiner

*Primary Examiner*—Duc M. Nguyen
*Assistant Examiner*—Wayne Cai
(74) *Attorney, Agent, or Firm*—Nixon Peabody LLP

(57) ABSTRACT

A low-voltage, low-power, synchronous, bidirectional, time-multiplexed, serial communication, scalable system bus carrying a number of signals over a fewer number of wires between a master device and peripheral devices or between peripheral devices. One of the wires carries a composite digital signal that includes a data signal and a synchronizing signal, though other combinations are contemplated. The system bus can support more peripheral devices than there are available time slots, and supports interrupt polling and servicing. In addition, peripheral devices that include an electro-mechanical or electro-acoustical component connected to the system bus can also communicate directly to each other without using the system bus. The system bus can be implemented in low voltage, low power devices, including listening devices such as hearing instruments and headsets, portable telephones, and personal digital assistants.

34 Claims, 15 Drawing Sheets

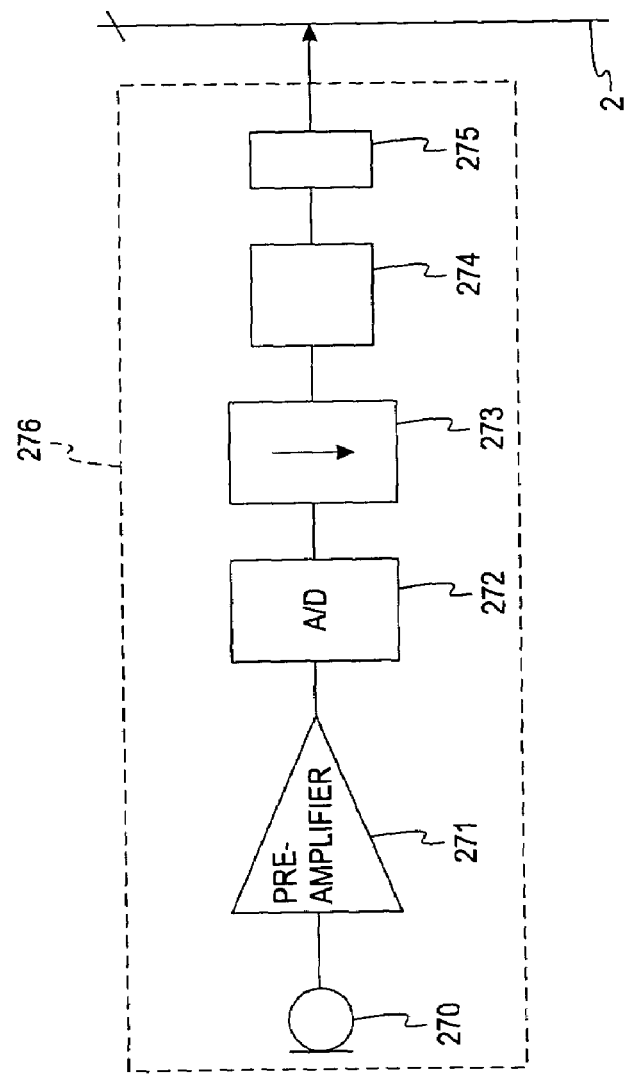

DUAL SLOT MODE

| BUS ERROR | DEVICE PRESENT | FRAME SYNC 1 | CONTROL DATA | FRAME SYNC 2 | DATA SLOT 1 | DATA SLOT 2 | AUX |
|---|---|---|---|---|---|---|---|
| 1 UNIT | 1 UNIT | 3 UNIT | 1 UNIT | 1 UNIT | 28 UNITS | 28 UNITS | 1 UNIT |

*Fig. 4a*

TRIPLE SLOT MODE

| BUS ERROR | DEVICE PRESENT | FRAME SYNC 1 | CONTROL DATA | FRAME SYNC 2 | DATA SLOT 1 | DATA SLOT 2 | DATA SLOT 3 |
|---|---|---|---|---|---|---|---|
| 1 UNIT | 1 UNIT | 3 UNITS | 1 UNIT | 1 UNIT | 19 UNITS | 19 UNITS | 19 UNITS |

*Fig. 4b*

FREE SLOT MODE

| BUS ERROR | DEVICE PRESENT | FRAME SYNC 1 | CONTROL DATA | FRAME SYNC 2 | FREE PROGRAMMABLE DATA SLOTS |
|---|---|---|---|---|---|
| 1 UNIT | 1 UNIT | 3 UNITS | 1 UNIT | 1 UNIT | 57 UNITS |

| INTERRUPT REQUEST | ENABLE INTERRUPT INFORMATION | ADDRESS | COMMAND | R/W | DATA | PARITY |
|---|---|---|---|---|---|---|
| 1 BIT | 1 BIT | 5 BITS | 7 BITS | 1 BIT | 16 BITS | 1 BIT |
| X | 0 | LSB...MSB | LSB...MSB | | LSB...MSB | |

Fig. 9

| INTERRUPT REQUEST | ENABLE INTERRUPT INFORMATION | DEVICE 1 | DEVICE 2 | DEVICE 2-29 | DEVICE 30 |
|---|---|---|---|---|---|
| 1 BIT | 1 BIT | 1 BIT | 1 BIT | 28 BIT | 1 BIT |
| 1 | 1 | | | | |

| PARAMETER | UNITS |
|---|---|
| GENERAL OUTPUT LEVELS | |
| LOGICAL ZERO | 0-15% Vdd |
| LOGICAL ONE | 85-100% Vdd |
| GENERAL INPUT LEVELS | |
| LOGICAL ZERO | 0-30% Vdd |
| LOGICAL ONE | 70-100% Vdd |
| LIMITS | |
| GROUND | 0.0 VOLT |
| Vdd, MIN | 0.7 VOLT |
| Vdd, MAX | 1.8 VOLT |
| SETUP AND HOLD TIME REQUIREMENTS | |
| MIN TIME TO TRI-STATE | 5 ns |
| MAX TIME TO TRI-STATE | 80 ns (TCLOCK/2) |
| MIN TIME TO EXIT TRI-STATE | 0 ns |
| MAX TIME TO EXIT TRI-STATE | 40 ns (TCLOCK/4) |
| MAX SETUP TIME FOR DATA | 40 ns (TCLOCK/4) |
| MAX HOLD TIME FOR DATA | 5 ns |

*Fig. 14*

DIGITAL SYSTEM BUS FOR USE IN LOW POWER INSTRUMENTS SUCH AS HEARING AIDS AND LISTENING DEVICES

FIELD OF THE INVENTION

This invention relates generally to system busses for low-power applications, and more particularly to a low-power, low-voltage system bus which can carry a number of signals over a fewer number of wires in a hearing instrument.

BACKGROUND OF THE INVENTION

In a typical system comprised of digital components, a bus connects the components together and is the conduit by which each component communicates information to another component. A bus usually consists of several lines or wires, each carrying a dedicated signal such as power, reference (ground), clock, synchronizing, and data signals. Data is communicated over one or more wires according to a protocol or specification which provides a set of rules by which components are permitted access to and use of the bus. In a serial bus, data can be transferred serially in a unidirectional or bi-directional fashion. In the case of a unidirectional serial bus, only one wire is needed to transmit or receive data between two components connected to the bus. However, in the case of a bi-directional serial bus, typically two wires are needed, one to transmit and the other to receive data between two components connected to the bus.

Several serial busses exist in the personal computer environment. For example, the Universal Serial Bus ("USB") and IEEE1394 ("Firewire") busses are examples of serial busses that operate in a high-power environment. Another bus that is used in PC audio systems is the AC97 link. However, none of these busses is well-suited for low-power, low-voltage environments because of their power demands. In addition, current communications busses take few precautions to ensure the integrity of signals in noisy environments. Certain low-power devices, such as hearing instruments and cellular phones, are highly susceptible to electromagnetic interference. Moreover, low-power devices tend to be small, and precious space can be saved by reducing the number of connections. Thus, many low-power devices tend to use serial busses to reduce the total number of wires.

Furthermore, in order to define the logic levels on a bus such as when bus owners are absent or there are no devices driving the bus, a pull-up or a pull-down resistor is traditionally used. However, this approach is problematic for in low-power environments that require short time constants. A high value pull-up or pull-down resistor results in a low power consumption, but long time constants (i.e., the bus will be slow). A low value pull-up or pull down resistor results in a short time constant, but unfortunately also in a relatively high current consumption.

Therefore, it would be advantageous to provide a low-voltage, low-power bus that reduces the number of wires without reducing the number of signals carried over the bus and that has well-defined logic levels without compromising bus speed. The present invention provides this and other advantages.

SUMMARY OF THE INVENTION

A hearing instrument includes a system bus connected between at least one master component and at least one electro-mechanical or electro-acoustical peripheral component (slave device). The system bus includes a number of lines, and at least one of the lines is a composite line which carries a composite signal composed of two or more digital signals between two or more components which can be either a master component, a peripheral component, or both. In one embodiment, at least five different digital signals can be carried on the system bus: a clock signal, a power signal, a synchronizing signal, a reference signal, and a data signal. The composite line, of which there may be more than one, can carry any combinations of two or more of the aforementioned digital signals.

In a specific embodiment, the system bus is a low-power, low-voltage, synchronous, bidirectional, time-multiplexed, scalable, serial communication bus. Data is time multiplexed over the system bus in blocks of frames. Frames may include audio data, bulk data, and/or control data in one frame or may include data transmitted over multiple frames. In another embodiment, the system bus includes a second data wire.

To maintain bus state when drivers are absent, a high-value pull-down or pull-up resistor (between about 500 and 1200 kilo-ohms) or pull-down or pull-up current source is coupled to the system bus. The present invention avoids compromising bus speed by using a special driving scheme, whereby the logic level of the system bus is maintained by all transmitters (master or peripheral components which transmit information on the system bus) at the same level toward which the pull-up or pull-down resistor pulls the system bus. Thus, the bus is driven fast into the correct value by the previous system bus transmitter (the "idle" state), before a handover to a new bus transmitter, while the resistor or current source maintains the logic value. In this fashion, it is possible to both achieve fast response time and low power consumption. Also, this scheme will allow for use of the bus with multiple transmitters at the same time using wired-OR logic.

The system bus is a low-voltage system bus, powered by a voltage in the range from about 0.7 volts to about 2.0 volts. The system bus is also a low-power system bus, which means that the total power consumption of the system bus alone is within the range of about 30 microwatts to about 1 mW. The total power consumption of the system bus plus components is within the range of about 0.2 mW to about 2 W. The system bus may be powered by a battery or other power source.

Applications of the system bus of the present invention include a hearing instrument, a personal digital assistant, and a portable telephone, such as a cellular telephone.

In accordance with another embodiment, a listening device includes electro-mechanical or electro-acoustical peripheral components including a microphone and a receiver. The microphone transduces an incoming acoustical audio signal to an electrical audio signal, and the receiver transduces a processed electrical audio signal to an output acoustical audio signal for broadcasting to a user of the listening device. The listening device also includes a system bus connecting the system processor (master component) with each of the peripherals. The system bus includes a plurality of lines, where one of the lines is a composite line for carrying two digital signals between the system processor and the peripherals.

A method of communicating signals in a hearing instrument over a system bus having fewer lines than signals is also provided. The method includes the steps of providing a number of lines in a hearing instrument, where one of the lines is a composite line. A composite signal which includes at least two digital signals is passed through the composite line in the hearing instrument. Optional steps include coupling the composite line to a pull-down resistor, connecting one of the lines to a battery, or connecting the system bus to a master component and a plurality of peripheral components.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 2b is a block diagram of a peripheral component in accordance with a specific aspect of the present invention;

FIG. 4a is a table showing the allocation of resources in a single data frame according to a Dual-Slot Mode of the present invention;

FIG. 4b is a table showing the allocation of resources in a single data frame according to a Triple-Slot Mode of the present invention;

FIG. 4c is a table showing the allocation of resources in a single data frame according to a Free-Slot Mode of the present invention;

FIG. 8 illustrates the fields of a control word for programming or receiving data from an electro-mechanical or electro-acoustical peripheral device in accordance with a specific aspect of the present invention;

FIG. 9 illustrates the fields of a control word when reading an interrupt request in accordance with a specific aspect of the present invention;

FIG. 14 is a table of exemplary electrical specifications of a system bus in accordance with a specific aspect of the present invention;

Figure 1:
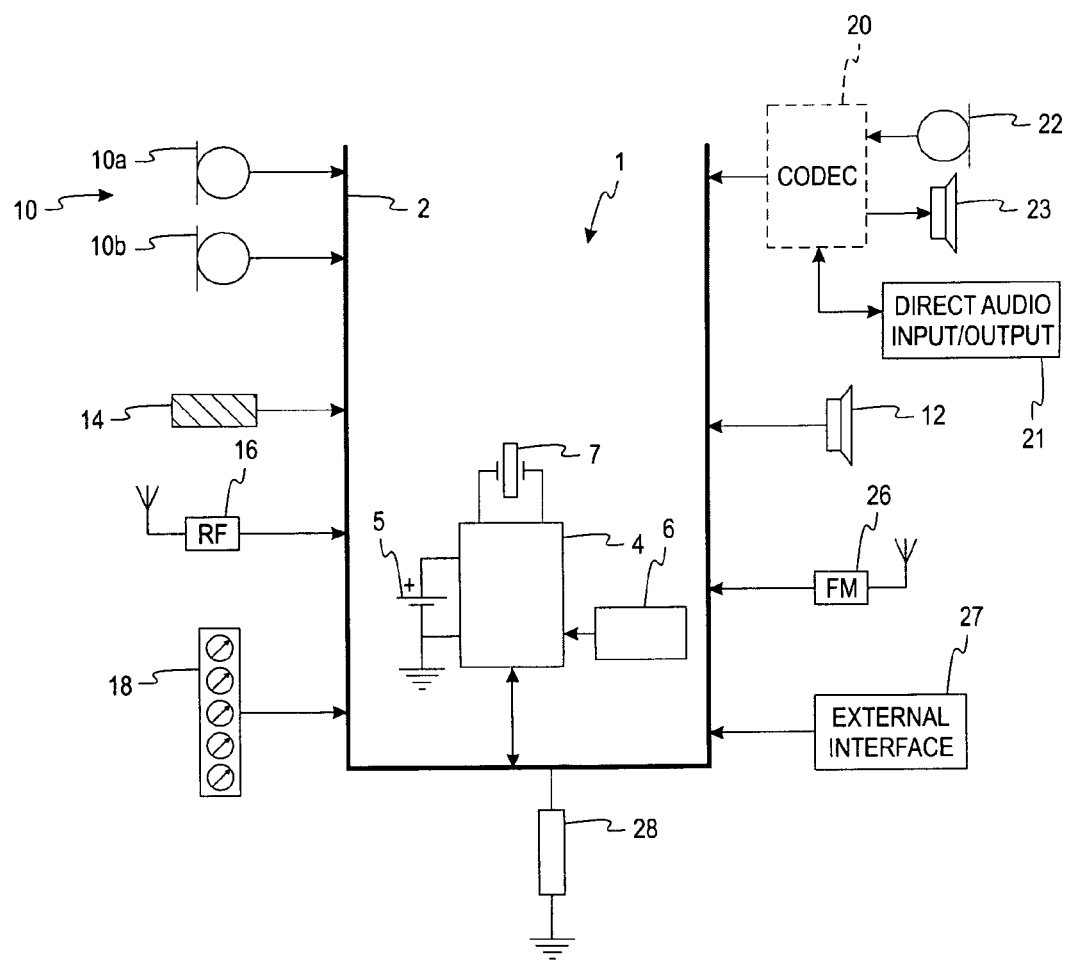
FIG. 1 is a block diagram of a hearing aid instrument system according to a specific aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Referring now to FIG. 1, there is shown a block diagram of a hearing aid system 1. The various components, not all of which may be present in a specific application, are shown as interconnected by a system bus 2. In one embodiment the system bus 2 is a three-wire bus, a first wire carrying a specially buffered clock signal, a second wire carrying a composite signal, and a third wire carrying a reference (ground) signal. The composite signal is a combination of a data signal and a synchronization ("sync") signal, and is explained in further detail below. In another embodiment, the low power bus 2 is a four wire bus, where the fourth wire carries a power (Vdd) signal. This latter embodiment will be discussed more with reference to FIG. 2a. In a preferred embodiment, the system bus 2 is a synchronous, bi-directional, time-multiplexed serial communication bus. The system bus 2 provides for three synchronous audio/data streams and 30 synchronous control paths. The protocol and messaging methodology used is described further in FIGS. 3-9.

The system bus 2 is connected to a microprocessor or digital signal processor 4 (hereinafter "microprocessor 4") which is powered by a battery 5. The microprocessor 4 may be designed using a high-definition language such as VHDL, for example. A memory 6 shown externally in FIG. 1 may alternatively be located within the microprocessor 4. The memory 6 is used for system programming and configuration information. A system clock 7 is connected to the microprocessor 4. A weak pull-down device 28 is shown. In the preferred embodiment, the device 28 is a high-value resistor having a value of about 500-1200K ohms. Alternatively, the device 28 could be a high-value pull-up resistor or a weak pull-down or pull-up current source.

The hearing aid system 1 includes at least one transducer for converting input acoustical audio signals to audio electrical signals. FIG. 1 illustrates a pair of digital microphones 10a, 10b operating together as a directional microphone 10. The digital microphones 10a, 10b are any combination of an electret-type condenser microphone or a silicon microphone based on MEMS technology. For digital operation, the audio output of the digital directional microphone 10 is carried within an audio/data channel as a digital electrical audio signal over the system bus 2. The microprocessor 4 processes the digital electrical audio signal into a processed digital electrical audio signal, which is carried to a receiver or speaker 12.

Alternatively, for analog operation, an optional codec 20 is shown which interfaces to a direct input/output audio device 21, an analog microphone 22, and an analog speaker 23. The direct input/output audio device 21 may be used to connect an audio device directly to the codec 20. Additional devices or peripheral components (slave devices or components) that may be present in the hearing aid system 1 include a telecoil device 14, a wireless RF transceiver 16, a wireless FM receiver 26, and digital control and monitoring devices 18. The control and monitoring devices 18 may include a volume control, a sensitivity control, a mode switch, or any other hearing-aid switches or controls. The mode switch switches between a sound mode and a telecoil mode. In the sound mode, the hearing aid system 1 receives sound signals via the directional microphone 10. In the telecoil mode, the hearing aid system receives magnetic signals indicative of sound via the telecoil 14. Certain of the peripheral devices are electro-mechanical or electro-acoustical peripheral devices, such as the microphone 10, receiver 12, telecoil device 14, and digital and control monitoring devices 18. The memory 6 is not an electro-mechanical or electro-acoustical peripheral device, although in some embodiments an electro-mechanical/acoustical peripheral device may comprise a memory.

The microprocessor 4 is a master component supplying a clock signal and a synchronization signal over the system bus 2 to the peripheral components, 10, 12, 14, 16, 18, 20 and 26. FIG. 1 shows eight peripheral components connected to the system bus 2, but fewer or more peripheral components may be connected to the system bus in other embodiments. In a specific embodiment, the predetermined addresses or product numbers of the peripheral components are stored in non-volatile memory 6.

The battery 5 is a low voltage battery having a voltage in the range of about 0.7 volts to about 2.0 volts, though the system bus 2 can operate in other voltage ranges. In the embodiment where the system bus 2 includes a wire carrying a power signal, Vdd, the battery 5 may optionally power the Vdd line.

An external interface 27 is used to couple the system bus 2 to another external system bus to permit two or more master devices in the hearing aid system 1. The external interface 27 may also be implemented in the microprocessor 4. The external interface 27 makes the externally interfaced system bus(ses) appear to be slaves in the hearing aid system 1. Inter-aural communication is an exemplary application for systems having two or more system busses coupled together via the external interface 27.

Figure 2A:
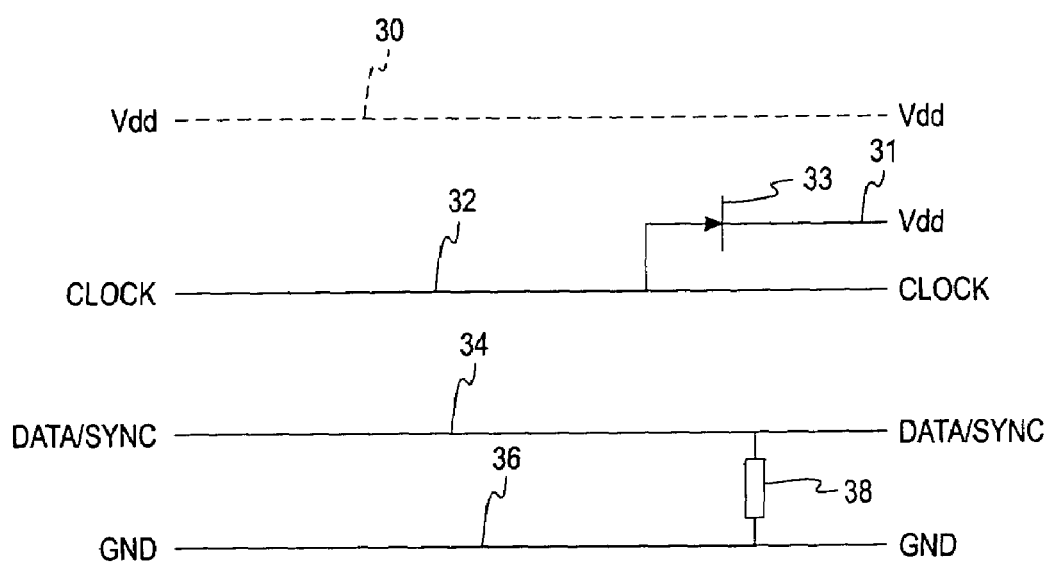
FIG. 2a is a wire schematic of a system bus in accordance with an embodiment of the present invention.

FIG. 2*a* is a wire schematic of the system bus 2. The system bus 2 includes a clock wire 32, a composite wire 34, and a reference wire 36, and optionally includes a power wire 30. The power wire 30 is preferred when a peripheral component on the system bus 2 consumes more than 300 μA RMS, when the total load on the system bus 2 exceeds 1 mA RMS, or when Vdd reconstruction from a rectified source is not desirable due to size constraints. However, in the preferred embodiment, a composite wire 32 carries a composite signal composed of a power (Vdd) signal 31 and a clock signal. The composite signal is readily accomplished due to the low-power requirements.

The composite signal composed of a power signal 31 and the clock signal is formed using a clock driver with low output impedance. The power signal is reconstructed from this signal using an active rectifying circuit 33 (such as a diode or other semiconductor device). The clock can be connected directly to the clock wire 32. The clock driver must be able to deliver at least 1 mA RMS current with a voltage drop of less than 0.1 (the voltage drop is measured with respect to the input voltage to the clock driver). The clock signal is a positive signal with respect to ground, with two cycles for every data bit for synchronization purposes. In other embodiments, Vdd may be obtained from a rectified sync signal or a combined clock/sync signal. The clock signal is negative signal with respect to ground with two clock cycles for every data bit for synchronization purposes. The term "unit" as used herein has the same duration as two system clock periods corresponding to one bit of data (or one data bit).

The composite wire 34 is a weak pulled down wire with tri-state drivers and carries both a data signal and a sync signal. The composite wire 34 coupled to the reference (GND) wire 36 through a weak pull-down source 38 which could be a high-value resistor or alternatively, a weak current source, to avoid undefined bus states. The data signals use positive logic levels. The reference (GND) wire 36 is the reference and return path for all devices on the system bus 2 and should have a low impedance, preferably below 10 ohms. The maximum capacitance for the clock wire 32 and the composite wire 34 is between about 22 pF and about 45 pF.

To make the capacity of the system bus 2 scalable with system clock frequency and current drain, the capacity of the system bus 2 is programmable for 1, 2, 3, 4, 6, and 8 channels or free programmable operation. The choice of the system clock 7 is unrestricted. Exemplary properties of the different operation modes and performance examples are provided in the following tables:

| | Specification of Operation Modes | | | |
|---|---|---|---|---|
| Mode Number | Operation Mode | Slot Mode | Frame rate | System Clock |
| 0 | Slot-Programmable Operation | Free | Fs | 128xFs |
| 1 | 1-Channel Operation | Dual | Fs/2 | 64xFs |
| 2 | 2-Channel Operation | Dual | Fs | 128xFs |
| 3 | 3-Channel Operation | Triple | Fs | 128xFs |
| 4 | 4-Channel Operation | Dual | 2xFs | 256xFs |
| 5 | 6-Channel Operation | Triple | 2xFs | 256xFs |
| 6 | 8-Channel Operation | Dual | 4xFs | 512xFs |

| | Performance Examples | | | |
|---|---|---|---|---|
| Mode Number | Word Width (Bits) | S-CLK at Fs = 10 kHz | S-CLK at Fs = 16 kHz | Max Fs at S-CLK = 6144 kHz |
| 0 | 1 to 56 | 1280 kHz | 2048 kHz | 48 kHz |
| 1 | 1 to 27 | 640 kHz | 1024 kHz | 96 kHz |
| 2 | 1 to 27 | 1280 kHz | 2048 kHz | 48 kHz |
| 3 | 1 to 18 | 1280 kHz | 2048 kHz | 48 kHz |
| 4 | 1 to 27 | 2560 kHz | 4096 kHz | 24 kHz |
| 5 | 1 to 18 | 2560 kHz | 4096 kHz | 24 kHz |
| 6 | 1 to 27 | 5120 kHz | High | 12 kHz |

In Slot-Programmable ("S-P") Operation, the number and start and stop positions of the data slots are free programmable by the master device prior to operation at startup or at reset. Accordingly, the startup routine for the S-P Operation is slightly longer than for the other operation modes.

In 1-Channel Operation, both available slots are assigned to the same slave. Accordingly, the system clock frequency can be half the normal value.

The tables provided above are exemplary only. The present system is very flexible and those skilled in the art will appreciate that it can be easily expanded to more channels and/or higher sample frequency ("Fs") at the expense of a higher system clock. Synchronization and transmission of control data is identical for all operation modes, and the operation modes can be selected dynamically during operation of the bus.

FIG. 2b is a block diagram of a peripheral component 276 according to a preferred embodiment of the invention. The peripheral component 276 comprises an electret element 270 adapted to receive acoustical signals and a preamplifier coupled to the electret element 270 so a to provide an amplified and/or buffered version of an electrical signal generated by electret element 270 in response to the received acoustical signals. The amplified/buffered signal is transmitted to A/D converter 272 that may comprise a sigma-delta modulator adapted to convert the amplified signal into a bit stream signal. A decimator 273 is operatively coupled to the A/D converter 272 and adapted to downsample and convert the bit stream signal to a multi-bit signal, preferably comprising a 16, 18 or 20 bit audio signal, at a lower sampling frequency, such as between 16 and 32 times lower than a sample rate of the bit stream signal. A bus controller 274 adapts the received multi-bit signal to the data format and protocol, as described below with reference to FIGS. 3 to 13, utilized on the system bus 2 and connects the peripheral component 276 to system bus 2 through a physical bus layer 275 which preferably contains one or more tri-state bus-drivers.

Figure 3:
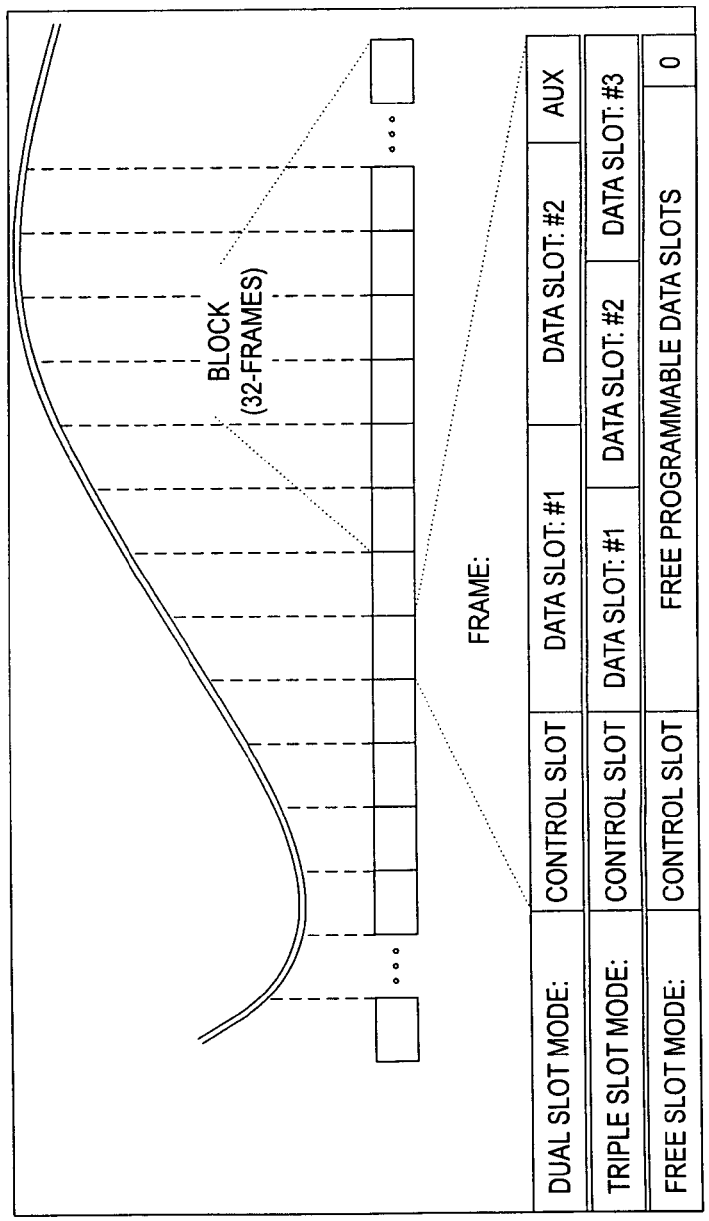
FIG. 3 illustrates a timing scheme of data frames communicated on the system bus according to a specific aspect of the present invention.

FIG. 3 is a block diagram of exemplary timing schemes that governs communication of blocks of frames according to three slot modes of operation over the system bus 2. A block consisting of 32 frames is shown, and each frame of each slot mode consists of 64 units for synchronization purposes. The clock frequency of the system bus 2 is between 512 kHz and 6144 kHz, corresponding to an audio data sample rate of between 8 kHz and 96 kHz. The frame repetition frequency is equal to the audio sample data rate between 8 and 96 Kb/s. For example, the Triple-Slot mode of operation uses 3 input/output audio streams, each with up to 18-bit sample data. Within one frame, data is transmitted in timeslots ("slots"). Each slot is followed by a separation unit that contains 0 for the first ¾ unit.

The control slot of each frame carries multibit control data between a peripheral component and the microprocessor 4 without requiring a high bandwidth. The multibit control data is transmitted in consecutive control-data bits in consecutive frames. Each frame carries one bit of data. 32 bits form one word, and the content of each word is described below. Control-data bits are signaled using either a "00" for logic-level zero or a "11" for logic-level one.

The three data slots shown in the Triple-Slot Mode of FIG. 3 are full audio bandwidth channels and are only assigned to devices which require such bandwidth capability such as the microphones 10a, 10b and receiver 12. Audio streaming data and bulk data are transmitted in consecutive timeslots in consecutive frames. Each frame carries one data-word per timeslot. Each of the three audio/data channels is signaled on the system bus 2 with nineteen 2-sample units and represent 18 recovered data bits in LSB order, in linear 2s complement representation including the 2s complement sign. Each data-word is followed by a 'slot-separation unit' that is always '00' (the 19th unit shown in FIG. 4b, for example). This aspect of the audio/data channels is described in more detail below.

FIGS. 4a-c illustrate the allocation of resources in a single data frame on the system bus 2 according to the Dual-, Triple-, and Free-Slot Modes of operation, respectively. Each data frame consists of 64 units. Each unit contains 2 sampled values so each data frame contains 128 sampled values/clock cycles. Bits are transmitted with the least-significant bit (LSB) first. Each recovered data bit requires two system clock cycles. The audio sample rate is equal to the frame rate, i.e., system clock frequency divided by 128. In Dual-Slot Mode (described in more detail below), the audio sample rate is equal to the system clock frequency divided by 256. Frame synchronization is accomplished in hardware using a synchronization pulse. Like the Operation Modes, the desired slot mode (Dual, Triple, and Free) is programmed by the master device at startup or reset.

The data frames shown in FIGS. 4a-b are subdivided into 8 different resources. The following tables summarize which type of data is allocated to each of the 64 units in the data frame according to the Dual-, Triple-, and Free-Slot Modes, respectively:

Dual-Slot Mode (FIG. 4A):

| Unit | Data |
| --- | --- |
| 0 | Bus error |
| 1 | Device present |
| 2-4 | Block or frame sync 1 (activated once every frame) |
| 5 | Control data in or out |
| 6 | Block or frame sync 2 (activated once every frame) |
| 7-33 | Incoming or outgoing audio data to or from a first audio device (unit 7 is LSB) |
| 34 | Separation unit (value is 0) |
| 35-61 | Incoming or outgoing audio data to or from a second audio device (unit 35 is LSB) |
| 62 | Separation unit (value is 0) |
| 63 | Auxiliary bit (value is 0) |

Unit 0 is reserved to signal a Bus Error, and this bit always ends in a logical zero. Unit 1 is reserved for the "Device Present"-bit ("DP") and has either a value "00" or "11," where "00" means not-"Device Present" and "11" means "Device Present." Units 2-4 carry either a "Block Sync" or a "Frame Sync" (see FIGS. 5 and 6), used for synchronization of frames and blocks. Unit 5 is reserved for control data (Input/Output, "CTL"), and has a value of either "00" or "11." Unit 6 carries a sync pattern "10" (see FIG. 5), and is used for synchronization of frames and blocks.

Units 7-33 carry audio sample word 1 comprising 27 bits in linear 2s complement representation. The least significant bit (LSB) is carried by unit 7 and the most significant bit (MSB) is carried by unit 33.

Unit 34 carries the separation unit and has a value of logical 0.

Units 35-61 carry audio sample word 2 comprising 27 bits in linear 2s complement representation. The LSB is carried by unit 35 and the MSB is carried by unit 61.

Unit 62 carries the separation unit whose value is logical 0, and unit 63 is reserved for the auxiliary bit whose value is logical 0.

Triple-Slot Mode (FIG. 4B):

| Unit | Data |
|------|------|
| 0 | Bus error |
| 1 | Device present |
| 2-4 | Block or frame sync 1 (activated once every frame) |
| 5 | Control data in or out |
| 6 | Block or frame sync 2 (activated once every frame) |
| 7-25 | Incoming or outgoing audio data to or from a first audio device (unit 7 is LSB) |
| 26-44 | Incoming or outgoing audio data to or from a second audio device (unit 26 is LSB) |
| 45-63 | Incoming or outgoing audio data to or from a third audio device (unit 45 is LSB) |

Note that each unit contains two sampled values or one bit of data. Details of each of the 64 units shall be described next. Unit 0 is reserved to signal a bus error and the second bit ends in a logical zero. Unit 1 is reserved for a device present flag and can have one of two values. Value "00" or logical 0 means that the device is absent. Value "11" or logical 1 means that the device is present. Units 2-4 carry either a "block sync" or a "frame sync" for synchronizing the blocks and frames, respectively. The "block sync" and "frame sync" are described in more detail with reference to FIGS. 5 and 6. Unit 5 is reserved for input or output control data and can have one of two values, "00" or "11." Unit 6 carries a sync pattern which is always "10" and is used for synchronizing frames and blocks. The sync pattern is described in more detail with reference to FIG. 5. Units 7-24, 26-43, and 45-62 carry a first audio sample word, a second audio sample word, and a third audio sample word, respectively. Each word is represented in linear 2s complement. The LSB is units 7, 26, and 45, respectively, and the most significant bit (MSB) is units 24, 43, 62, respectively. Units 25, 44, and 63 are each a separation unit whose value is "00" or logical 0.

Free-Slot Mode (FIG. 4C):

| Unit | Data |
|------|------|
| 0 | Bus error |
| 1 | Device present |
| 2-4 | Block or frame sync 1 (activated once every frame) |
| 5 | Control data in or out |
| 6 | Block or frame sync 2 (activated once every frame) |
| 7-62 | Free programmable data slots |
| 63 | Separation unit (value is 0) |

Units 7-62 can be programmed into multiple data slots as desired. Each data slot should end in a slot separating 0.

In other embodiments, the number of audio channels and the length of each audio channel in the data frame shown in FIG. 4 are programmable. The start and length of each audio word is programmed by the master to the slaves through the command channel. In these other embodiments, the programmable audio format is as follows:

| Unit | Data |
|------|------|
| 0 | Bus error |
| 1 | Device present |
| 2-4 | Block or frame sync 1 (activated once every frame) |
| 5 | Control data in or out |
| 6 | Block or frame sync 2 (activated once every frame) |
| 7-N | Audio data 1 |
| N+1 | Zero marker |
| N-M | Audio data 2 |
| . | |
| . | |
| . | |
| Y-Z | Audio data P |
| Z+1 | Zero marker |
| . | |
| . | |
| . | |
| 63 | Zero marker |

Thus, for example, a two-channel audio system, where each channel has a length of 27 data bits, is programmed such that the data frame is as follows:

| Unit | Data |
|------|------|
| 0 | Bus error |
| 1 | Device present |
| 2-4 | Block or frame sync 1 (activated once every frame) |
| 5 | Control data in or out |
| 6 | Block or frame sync 2 (activated once every frame) |
| 7-33 | Audio data 1 |
| 34 | Zero marker |
| 35-61 | Audio data 2 |
| 62-63 | Zero marker |

In addition, the audio data for a single sample may be transferred over more than one frame, in order to enable long data words or multiple audio channels that will not fit in a single data frame. To signal the use of multiple frames for a single sample, an extended frame signal is indicated that is unique and different than both the normal frame start symbol (binary 100100) and the block start symbol (binary 110110). The extended frame start symbol is placed in the same position of a frame as the frame start and block start symbols (e.g., units 2-4 and 6).

Figure 5:
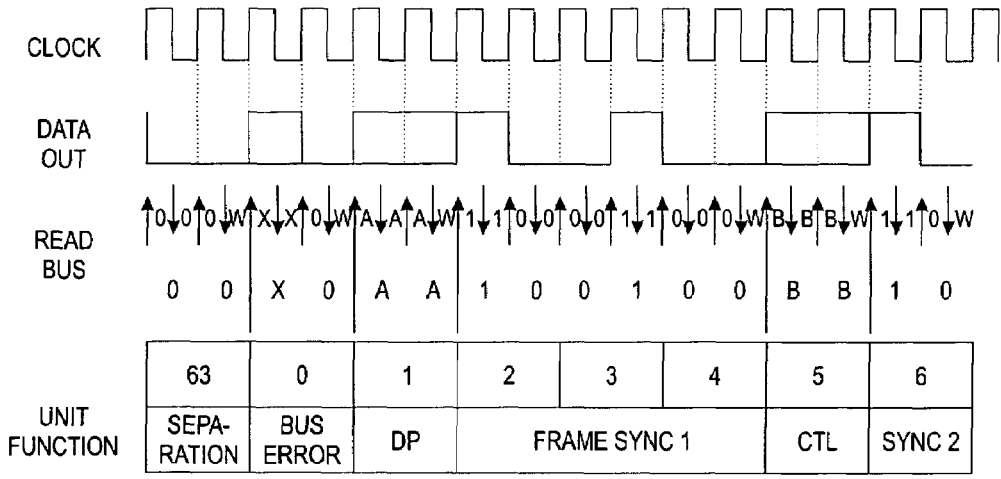
FIG. 5 illustrates a synchronization scheme of each frame in accordance with a specific aspect of the present invention.

FIG. 5 illustrates a frame synchronization scheme for the system bus 2. For normal audio/data transmission and control-data transmission, the data will be held at the same logic level for at least two clock periods. The data should change at the rising clock edge, and is sampled at the falling clock edge. Data changes within one bit, between two consecutive units happens in sync-signals and bus-error flags. The first 6 units at the beginning of a frame are shown. In order to achieve safe synchronization, the peripheral device should preferably test for both Frame Sync 1 and Frame Sync 2 patterns ("100100" and "10"). In addition, the peripheral should preferably test that the two values before and in the middle of the sequence are each repeated twice ("AA" and "BB"). In other words, the two values that represent unit 1 should be equal and the two values that represent unit 5 should also be equal (but it is not required that "A" and "B" be equal).

Figure 6:
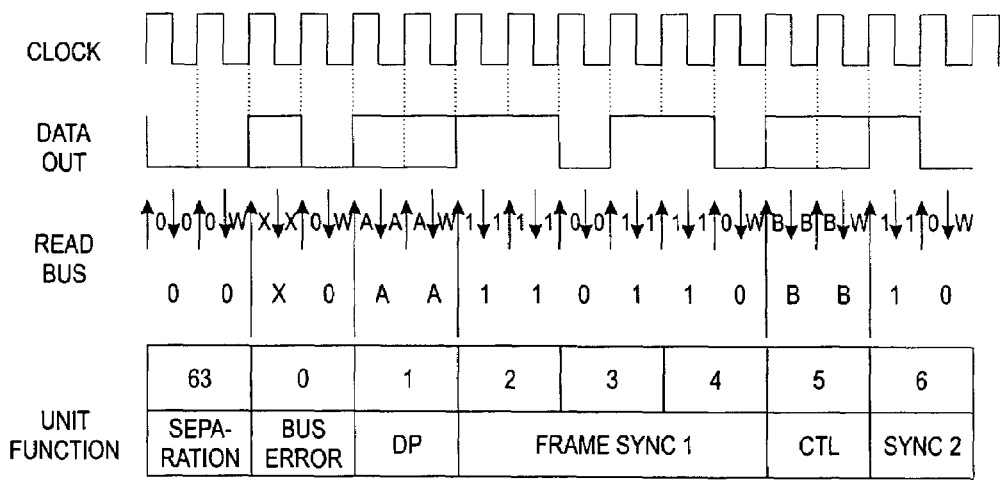
FIG. 6 illustrates a synchronization scheme of each block of frames in accordance with a specific aspect of the present invention.

FIG. 6 illustrates a synchronizing scheme to delimit blocks of frames. The primary function of the block grouping is to synchronize the use of the control data which is carried one bit at a time in each frame, "00" for a logical 0 and "11" for a logical 1. To synchronize the start of a block, Frame Sync 1 contains the pattern "110110" and Frame Sync 2 contains a "11" pattern. The frame containing the block synchronizing pattern has the first and LSB-bit of the control word.

Figure 7:
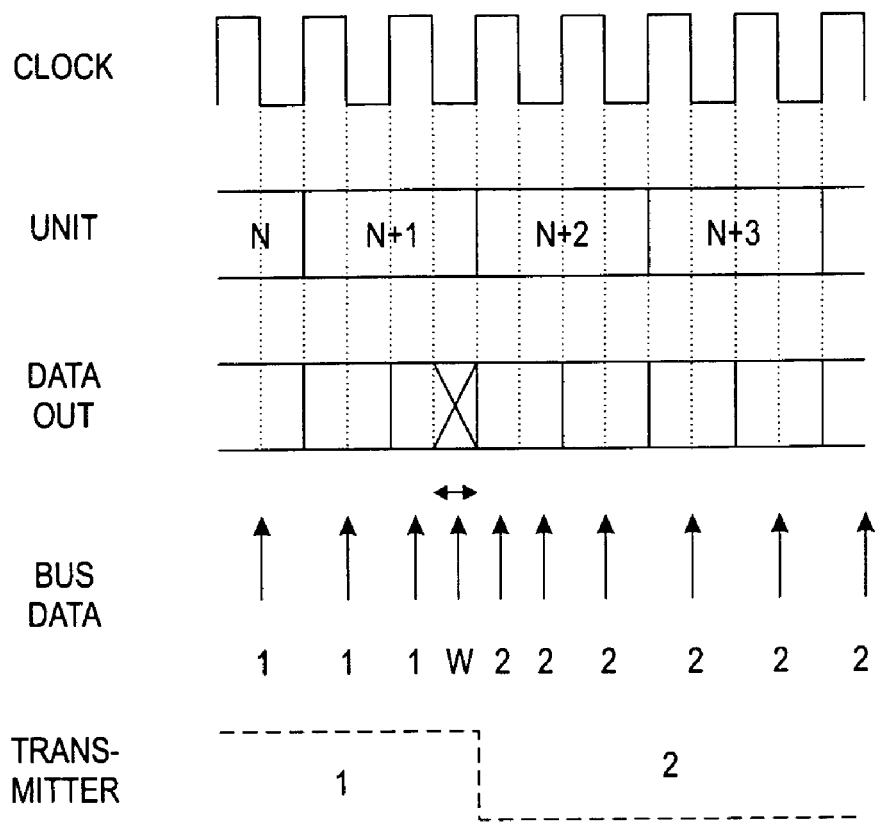
FIG. 7 illustrates the transition of the transmission by one electro-mechanical or electro-acoustical peripheral device to the transmission by another peripheral device in accordance with a specific aspect of the present invention.

FIG. 7 illustrates the preferred method of the embodiment to control sharing and usage of the system bus 2 even in the absence of a transmitter for any given time slot. To prevent glitches and collisions on the bus, measures have to be taken in the change of the bus-transmitters. Transfer can be done to two kinds of new transmitters: known transmitters (e.g., the master) and unknown (or even absent) transmitters. The next transmitter is known to be the master in the case of the DP and CTL fields (shown in FIGS. 5 and 6). The transmitter of audio data in the three audio/data time slots is determined by previous programming done by the master.

The last unit before the system bus 2 is used by a new transmitter in the following way: The first ¾ unit is used to transmit data, while the control of the bus is removed at the last ¼ of the unit by switching the driver into tri-state and letting the bus go into weak pull down. Accordingly, it is necessary to enter tri-state within ¼ unit or ½ clock period.

With an unknown or even absent transmitter, the system bus 2 needs to operate as follows. Before handing the bus 2 over to an unknown transmitter, the current bus-transmitter leaves the data bus in a low state before switching into tri-state. This way all data transmissions end in a level "0" by switching the system bus 2 to 0 before handing it over to an unknown transmitter.

Invalid data caused by a spike or glitch, for example, may be recognized when unit values of "01" or "10" are received in any fields other than the Frame Sync 1 field shown in FIGS. 5 and 6.

Each device on the bus has a device-number in the range of 1-30 which corresponds to the frame number in the synchronized blocks of frames shown in FIG. 3 and delimited by the FrameSync patterns. The device number 31 is used to talk to all peripheral devices at once. In a specific embodiment, there are a maximum of 30 peripheral devices connectable to the system bus 2, and each peripheral is allocated a device number according to its functionality. For example, the device numbers in a hearing instrument could be allocated as follows:

1-10: Source transducers; 11-15: Receiver transducers; 16-25: Control devices; 26-30: Other devices. It should be understood that the device numbers can be allocated in any desired manner, and the system bus 2 may support fewer or more than 30 peripheral devices.

Peripheral devices that are present and ready to act signal the "device present" in the DP field of the frame whose number matches the device number of the peripheral device. For example, device address 5 signals "11" in the DP field of frame 5 counting from the start of the first frame in a delimited block of frames. In frames that do not have matching bus members, the system bus 2 remains low due to the pull-down device 28.

It is possible to insert and remove devices from the system bus 2 when it is active. The DP field notifies the master component if a peripheral device has been added or removed from the system bus 2 and can also be used to identify problems with a peripheral device in an early stage (e.g., lost synchronization). Bus error is signaled in the Bus Error field, using wired-OR (normally maintained low using the high-value pull-down resistor). Any device can pull the data signal high during the first half of time unit 0 to signal a bus error. Thus "error" is signaled as "10" and "no error" is signaled by keeping the peripheral output drivers in a tri-state condition.

In a preferred embodiment, the microprocessor 4 initiates two types of control words. The first type is a standard control word, shown in FIG. 8, which is used for updating the peripheral devices. The second type is an interrupt polling control word, shown in FIG. 9, which used to poll the peripheral devices in the event they require interrupt handling. A control word is transmitted and received over 32 consecutive frames of a block as shown in FIG. 1 one bit per frame using the CTL field. In this manner, the LSB of a control word is in the first frame of a block indicated by the Sync Field 1 and the MSB of any control word occurs in the last frame of the 32 frame block. FIGS. 8 and 9 represent reassembled 32-bit control words and are described below.

FIG. 8 illustrates the format of a standard, reassembled control word for programming or receiving data from a peripheral component or device. The control word is subdivided into seven fields: interrupt request, enable interrupt information, address, command, R/W, data, and parity. The interrupt request field bit (bit 0) of the control word is maintained at logic zero if no devices requires attention. If any device requires attention, it can pull bit 0 high ("11"). Due to the driving method, a wired-OR is possible. The next bit (bit 1) is a control bit from the master component that indicates whether the master component requests information from the peripheral devices (e.g., which peripheral device(s) has signaled an interrupt). If this bit 1 is high, the master component requests the peripheral devices to indicate whether they have signaled an interrupt. The address field provides for addressing up to 30 devices. The command field provides for 128 commands.

The following list of commands and devices is exemplary and is not intended to limit the scope of the present invention. Those skilled in the art will appreciate that a different set of commands can be used without departing from the scope of the present invention. In a specific embodiment, the following commands for a minimum bus implementation and for an expanded bus implementation are provided next:

Command programming guide for the minimum bus implementation:

| | |
|---|---|
| 0 | NOP (no operation) |
| 1 | Reset device |
| 2 | Turn device output on ('write 0' does not change state, '1' enables device output) |
| 3 | Low power mode ('0' is normal operation, '1' turn off device except interface control) |
| 4 | Ask for status (answer '0' is normal operation, '1' is malfunction) |
| 5 | Set device to audio slot 1 |
| 6 | Set device to audio slot 2 |
| 7 | Set device to audio slot 3 |

Additions to minimum bus implementation (device dependent)

| | |
|---|---|
| 8 | Manufacturer's ID |
| 9 | Manufacturer's part number |
| 10 | Manufacturer's serial number (part I) |
| 11 | Manufacturer's serial number (part II) |
| 12 | Switch direction for audio data (0-> LSB first, MSB last (default), 1-> MSB first, LSB last) |
| 13 | Parity bit included in audio 18 bit word (0-> not included (default), 1-> included) |
| 14 | Enable double word mode (optional, 0-> single slot mode (default), 1-> double slot mode) |
| 15 | Set to double word slot A/B (optional, 0-> slot A, 1-> slot B) |

-continued

| | |
|---|---|
| 16-63 | Future expansion, device data defined by system bus provider |
| 64-127 | Future expansion, data defined by individual device manufacturer |

In the specific embodiment, the following list of device addresses is provided:

| Device address | Description |
|---|---|
| 00000 | Idle (no devices) |
| 00001 | Digital microphone 1 (audio and control) |
| 00010 | Digital microphone 2 (audio and control) |
| 00011 | Digital microphone 3 (audio and control) |
| 00100 | Digital microphone 4 (audio and control) |
| 00101 | Digital speaker 1 (audio and control) |
| 00110 | Digital speaker 2 (audio and control) |
| 00111 | Digital speaker 3 (audio and control) |
| 01000 | Digital speaker 4 (audio and control) |
| 01001 | Telecoil 1 (audio and control) |
| 01010 | Telecoil 2 (audio and control) |
| 01011 | Wireless audio 1 (left) (audio and control) |
| 01100 | Wireless audio 1 (right) (audio and control) |
| 01101 | Wireless audio 2 (left) (audio and control) |
| 01110 | Wireless audio 2 (right) (audio and control) |
| 01111 | Wireless programming 1, high security (control) |
| 10000 | Wireless programming 2, high security (control) |
| 10001 | Wireless control 1 (control) |
| 10010 | Wireless control 2 (control) |
| 10011 | EEROM 0 (control) |
| 10100 | EEROM 1 (control) |
| 10101 | Volume control and switches 0 (control) |
| 10110 | Volume control and switches 1 (control) |
| 10111 | FM radio (left) |
| 11000 | FM radio (right) |
| 11001 | Mobile phone |
| 11010 | AUX 0 (audio and control) |
| 11011 | AUX 1 (audio and control) |
| 11100 | AUX 2 (audio and control) |
| 11101 | AUX 3 (audio and control) |
| 11110 | AUX 4 (audio and control) |
| 11111 | All devices |

Alternatively, instead of a device address, the slave devices can be associated with a unique product number that is programmed into a non-volatile memory.

The data in the data field can come from either the master or from a peripheral, depending on the R/W field (bit 14) (1 is read data from peripheral, 0 is write data to peripheral). The 16 bits of data are transmitted with LSB first, MSB last. The parity field is an even bit parity supplied by the transmitter of the control word. Thus if the R/W bit is a 1 then a peripheral device generated parity.

FIG. 9 illustrates the format of the preferred 32-bit interrupt control word used by the microprocessor 4 to poll the peripheral devices that can signal the microprocessor 4 when they need interrupt handling. The interrupt contro word includes 32 fields having one unit each: interrupt request, enable interrupt information, and separate fields corresponding to devices 1-30. The first unit is maintained at logic zero by the high value resistor, and any device can signal an interrupt during its time unit (using "11"). The second unit is generated by the master component and informs the peripheral devices that a command is given ("00") or that the peripheral devices should inform the master device of their interrupt status. In the latter case, each device responds by a "00" (no interrupt requested) or "11" (interrupt request by device), when the frame number equal to the device number in the time unit 5 of that frame.

There is another alternative mode of operation which allows use of up to 6 audio/data channels on the same bus, a double-slot mode. The double slot mode may be accomplished in the following manner. The audio/data streams may be split between two different sources, X or Y. The master programs the peripherals to be an X-type or a Y-type. X-type devices use the audio/data channel assigned in even Frames of a block while Y-type devices use the audio/data channel assigned in the odd Frames of the block. Note that the first frame with a block synchronization signal is number zero and is thus an even or X-type frame. Note that this effectively halves the audio sampling rate available unless the clock frequency is doubled to compensate.

Figure 10:
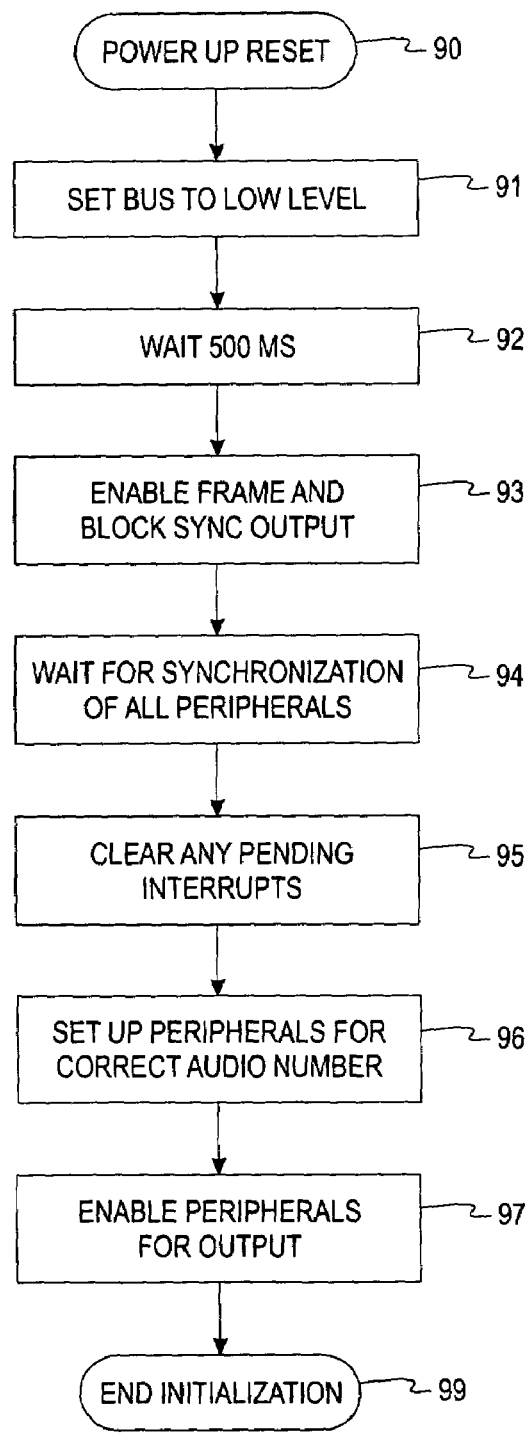
FIG. 10 is a flow chart of the steps performed by a master device on a system bus according to a specific aspect of the present invention.

FIG. 10 shows a flowchart of the preferred initialization sequence for the simplest implementation of the master component of a hearing aid system 1. The sequence is entered at step 90 on power up or system reset. At step 91 the DataSync wire 34 of the system bus 2 is set to logic level 0. At step 92 there is a wait of 500 milliseconds for all devices to settle and perform power up and reset functions. At step 93 the master device enables the output of the framing signal and synchronization fields so that the peripheral devices may start their synchronization processes. At step 94 there is a wait to receive synchronization indication, (i.e., any device present outputs flag is set as discussed below in FIG. 11) from all expected peripheral devices in the hearing aid system 1. At step 95 any pending interrupts from peripherals are cleared. At step 96 the audio/data channel address numbers 1-3 are sent to appropriate peripheral devices which will use the audio/data channels. At step 97 the peripherals are enabled for output capability.

Figure 11:
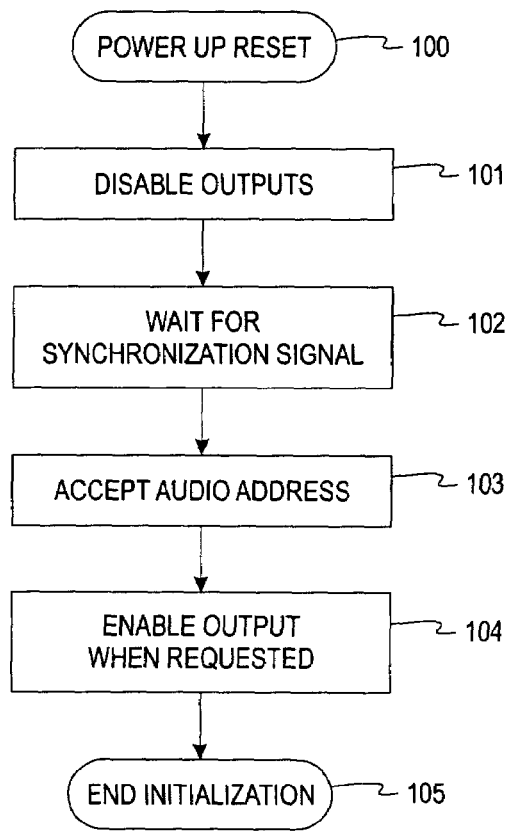
FIG. 11 is a flow chart of the steps performed by an electro-mechanical or electro-acoustical peripheral device during initialization in accordance with a specific aspect of the present invention.

FIG. 11 shows the preferred sequence that the peripheral devices should use for initialization. The sequence begins on power up, reset at step 100. At step 101 all outputs are disabled, the DataSync wire 34 of the system bus 2 in particular is set to a tri-state condition. At step 102 the slave waits to attain synchronization, which is described in detail in FIGS. 12 and 13. No action on the part of a peripheral device may take place until synchronization has been achieved and maintained. If synchronization is lost then the peripheral device must re-enter this initialization sequence. At step 103, after synchronization is established, the peripheral waits to receive an audio/data channel address if this is applicable to the particular peripheral device. Then at step 104 the peripheral waits to receive an output enable signal from the master and at step 105 initialization is complete. After step 105 the peripheral is enabled to request interrupts, broadcast audio data and receive audio data depending on the requirements of the device.

For proper operation of the hearing aid system 1, and to safeguard against collisions on the system bus 2, the peripherals must attain and maintain synchronization with the framing signal from the microprocessor. This synchronization scheme uses three counters, MASTER_CT and UNIT_CT which are 7-bit counters and SYNC_CT which is a 3-bit counter and a indicator flag SYNC which indicates 0=no synchronization and 1=synchronization. A practical implementation to obtain and maintain synchronization is shown in FIGS. 12 and 13.

Figure 12:
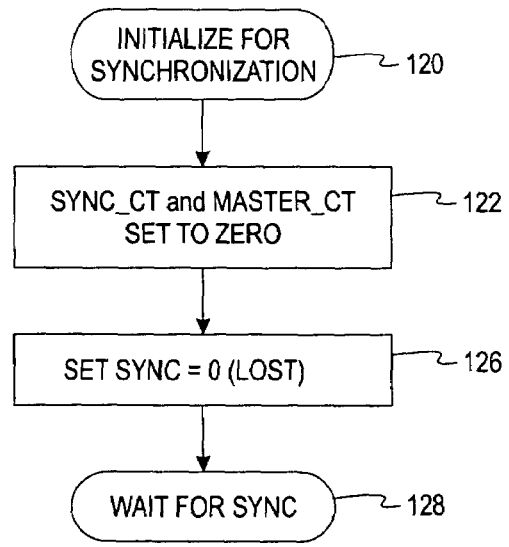
FIG. 12 is a flow chart illustrating the steps of an initialization sequence in accordance with a specific aspect of the present invention.

FIG. 12 is a flowchart of an initialization sequence. The sequence is entered at step 120. At step 122 the synchronization counters SYNC_CT and MASTER_CT are set to zero. At step 126 the SYNC flag is set to zero to indicate loss of synchronization. At step 128 the device waits for synchronization to be established and SYNC=1.

Figure 13:
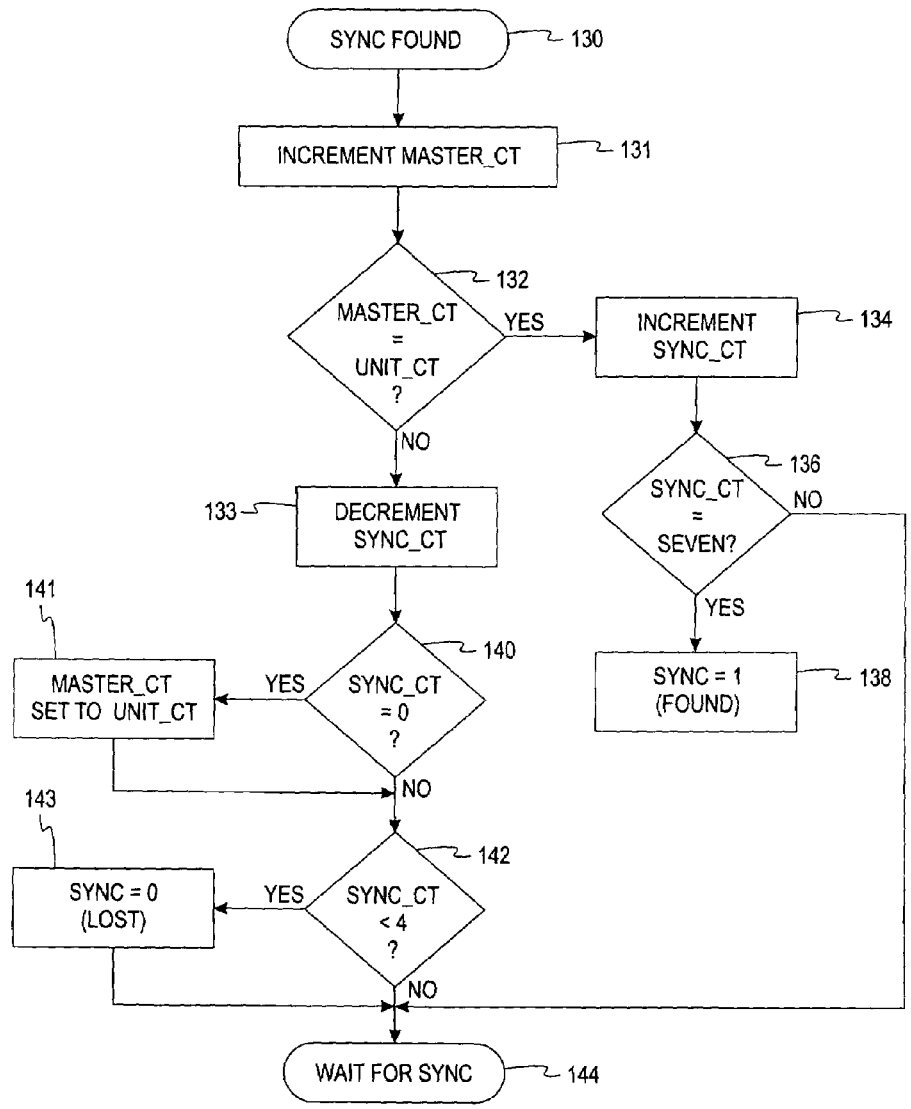
FIG. 13 is a flow chart of the steps performed in order to achieve safe synchronization in accordance with a specific aspect of the present invention.

FIG. 13 illustrates a subroutine entered at step 130 when a peripheral device recognizes the FrameSync fields of the framing pattern following the initialization sequence shown in FIG. 12. At step 131 the MASTER_CT is incremented and at step 132 it is compared to the UNIT_CT to see if there has been any change. If the two counters are equal then at step 134 the SYNC_CT is incremented (note: SYNC_CT is a sticky 3-bit counter with a maximum value of 7) and if SYNC_CT has reached 7 then the SYNC flag is set to 1 to indicate SYNC attained and the task exited at step 144. If SYNC_CT was not incremented to 7 then the task is exited at step 144, and no further checks are necessary. If the MASTER_CT is not equal to the UNIT_CT then at step 133 the SYNC_CT is decremented but only to zero. Then at step 140 SYNC_CT is checked and if it is zero, at step 141 the MASTER_CT is set to the UNIT_CT, which effectively resets the scheme. At step 142, the SYNC_CT is checked, and if it is greater than 4 then the routine is exited at step 144, otherwise the SYNC flag is set to zero at step 143, to indicate that synchronization has been lost, and the task is exited at step 144. This scheme allows SYNC_CT to be decremented at step 133 four times before the loss condition is set. The values for SYNC_CT used are exemplary only and other values could be used without departing from the scope of the present invention.

FIG. 14 illustrates a summary of exemplary electrical specifications for the system bus 2 according to a specific aspect of the present invention. Those skilled in the art will appreciate that the electrical specifications may be varied to suit a particular application. The electrical requirements for output drive capability are next described. The bus load resistor should be designed so that the time constant of the resistance and the bus capacitance is at least ¼ of the time for one data frame (128 clock cycles/3 or approximately 30 clock cycles). The bus load resistor is used to define the bus in case of device malfunction. It may also be implemented as a load resistor inside each peripheral device and has a value of about 1 mega-ohm. The output of the driver should be disabled on power-up reset and in the case of a detected sync error.

The power consumption of the system bus 2 can be estimated from the capacitive load and the bus frequency. For example, if the bus frequency is 2 MHz (audio sample frequency 16 kHz) and the bus load is 30 pF, the power consumption of the clock line is about 30 µW. The data line will change approximately ¼ times the clock frequency, which yields a total power consumption of the entire system bus 2 of about 38 µW. For a required rise time of less than 80 ns (clock period divided by 4), the necessary output current should be about 1 mA. As previously noted, these values are exemplary only, and describe a very specific implementation of the system bus 2.

Next, a few characteristics of the system bus 2 according to the present invention will be described, and these characteristics apply to any embodiment described herein. First, the system bus 2 is optimized for low-power environments. Second, the system bus 2 generally provides a number of functionalities (e.g., reference, power, clock, synchronization, and data functionalities) by using a fewer number of wires. Third, the system bus 2 may provide more than two functionalities on a single wire (e.g., providing power, clock, and synchronization signals on a single wire). Fourth, the system bus 2 is bidirectional for all data types used. Fifth, the system bus 2 provides for simultaneous bidirectional communication of streaming and/or bulk data and control data. Sixth, the data frames are communicated at frequencies of FS to 4FS, where FS is the sampling frequency of audio data (Nyquist format). Seventh, the system bus 2 enables the parameters and settings in devices connected to the system bus to be changed. Eighth, the system bus 2 enables data to be stored in devices (master or peripheral) connected to the system bus 2.

Although the system bus 2 has been described above as having a composite wire carrying a data signal and a sync signal, other wire/signal combinations are contemplated by the present invention. In one embodiment, a clock signal and a sync signal are combined on a single wire. To reconstruct the separate signals, a locked PLL is required in the peripheral device, however, the present invention also contemplates reconstruction of the signals without requiring a PLL. The sync signal could be signaled by providing a duty-cycle change (50% to 75-90%) in one or two clock cycles. Alternately, sync could be signaled by having the clock transition could occur in an unusual place, such as 1.5 cycles up followed by 1.5 cycles down. Alternately, the sync could be signaled by inserting a missing clock pulse which could be made available in the data signal.

In another embodiment, the power signal and the clock signal are provided on a single wire. This embodiment was described in connection with FIG. 2a.

In still another embodiment, the power signal and the sync signal could be provided on a single wire. Like the previous embodiment, the power signal could be made out of a rectified sync signal using a rectifier diode.

In yet another embodiment, the power signal and the data signal could be provided on a single wire. In this embodiment, the data signal is modulated on top of the power signal. This embodiment desirably introduces a less periodic disturbance on the power line than in the previous two cases.

In other embodiments, more than two signals are combined on a single line. According to one embodiment, a power signal, a clock signal, and a sync signal are provided on a single wire. The power signal is made of a rectified composite signal composed of the clock signal and the sync signal. According to another embodiment, a clock signal, a data signal, and a sync signal are carried on a single wire. This self-clocking, self-synchronizing data signal requires a clock or a stable PLL in the peripheral device. FM modulation of the composite signal improves signal integrity.

The system bus 2 according to the present invention can be implemented in a variety of communication configurations: simplex equal, duplex equal, triplex equal, simplex unequal, duplex unequal, and triplex unequal. The simplex equal configuration provides for unidirectional communication from a master to the same or fewer number of peripherals as there are available timeslots. The duplex equal configuration provides for bidirectional communication between a master and the same or fewer number of peripherals as there are timeslots. The triplex equal configuration is the same as the duplex equal configuration, except that the peripherals connected to the system bus can also communicate between one another. The simplex unequal configuration provides for unidirectional communication from a master to more peripherals than there are available timeslots. The duplex unequal configuration provides for bidirectional communication between a master and more peripherals than there are available timeslots. Finally, the triplex unequal configuration is the same as the duplex unequal configuration, except that peripherals connected to the system bus can also communicate between one another. In a preferred embodiment of the present invention, the system bus 2 employs a duplex unequal or triplex unequal communication configuration.

In addition to the features described above, the present invention also provides for the following features. The number of peripherals which can be accessed is scalable by the use of different system clock frequencies. The width of the command and data slots is also scalable. The number of wires can be increased or decreased for different peripherals. For example, a digital receiver could receive an extra power and/or an extra data wire. Finally, the devices connected to the system bus may be designed using simple standard digital library cells without the use of a PLL, a DLL, or delay circuitry.

As described above, up to 30 peripheral devices or components can be connected to a system bus according to the present invention. Of these 30 peripheral components, up to 3 or 6 (in double-slot mode) can be accessed simultaneously. In another embodiment, more peripherals can be accessed in parallel by increasing the system clock and/or adding one or more data wires.

As described above, peripheral components connected to the system bus 2 can interrupt the microprocessor 4 by using a dedicated interrupt bit in the control section of a frame. In another embodiment, peripherals can interrupt by using a dedicate interrupt wire.

The system bus 2 according to the present invention offers great flexibility in a variety of low power devices. For example, in a hearing aid environment, the system bus 2 can be used in a variety of hearing aids ranging from a small in-the-ear type hearing aid with one omni microphone to a large behind-the-ear hearing aid with multiple microphones and a telecoil. The present invention also offers the possibility of increased control, such as by using a digital volume control or a wireless transceiver.

The system bus 2 according to the present invention may be used for wireless programming of a hearing instrument, such as a hearing aid, while simultaneously providing digital audio data to the user during adjustment of internal parameters of the hearing instrument. This wireless programming aspect of the present invention replaces the conventional 4-wire programming cable that is traditionally used to provide programming data only to the hearing instrument during programming. Users employing a conventional programming cable must wear headphones during programming so that hearing adjustments can be heard as the unit is being programmed. Because a hearing aid according to the present invention can be programmed wirelessly by providing both digital audio data and programming data, such headphones are unnecessary and the hearing adjustment equipment can be digital. For example, the hearing adjustment equipment in some embodiments is a conventional wireless-enabled personal computer (using an IEEE802-based protocol, for example). It should be noted that the present invention also contemplates wired programming using a wired programming cable.

Those skilled in the art will appreciate that for wireless programming, the hearing aid system 1 includes a wireless system bus interface (not shown), RF electronics, and an antenna.

Although the present invention has been described with reference to a hearing instrument system 1, the present invention can be implemented in a variety of other low power applications, including low-power telecommunications, headsets, and low-power handheld devices such as personal digital assistants and portable telephones including cellular telephones.

The system bus of the present invention also supports more than one master component. FIG. 1 shows one master component, the microprocessor 4, connected to the system bus 2, however, in other embodiments, more than one master component can be connected via the external interface 27, such as shown in FIG. 15.

Figure 15:
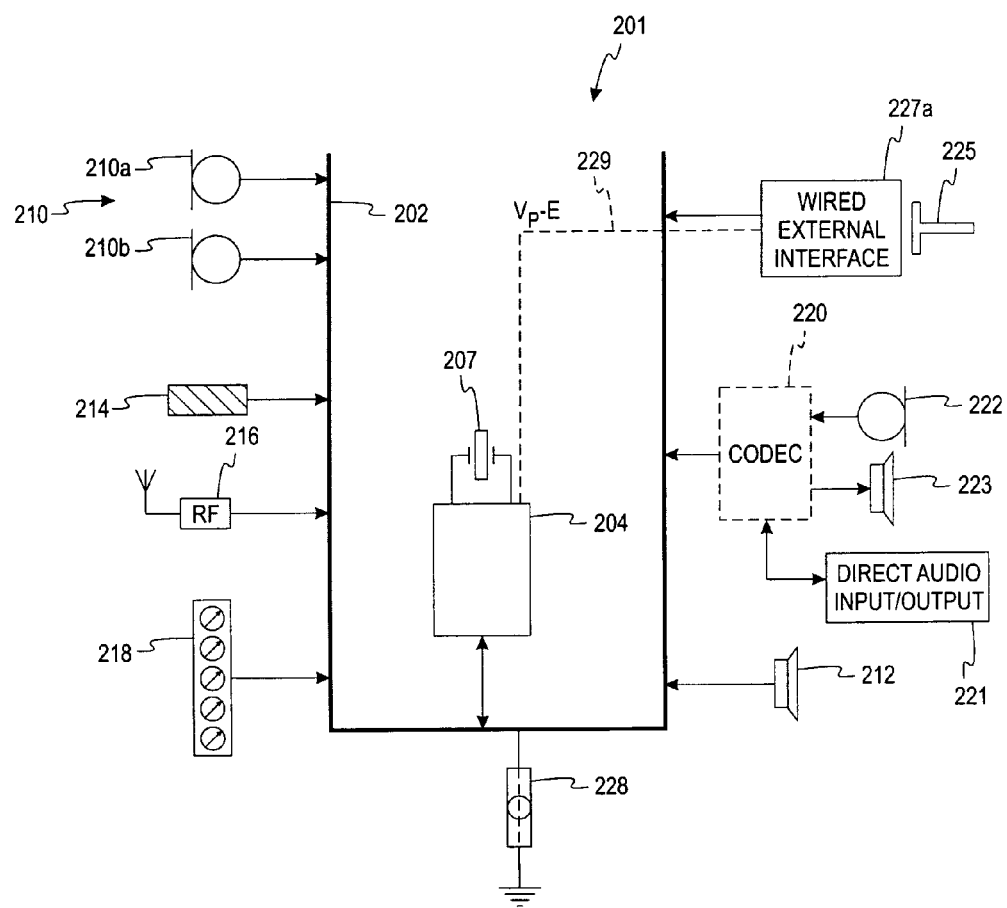
FIG. 15 is a block diagram of a hearing aid instrument system with a wired external interface according to a specific aspect of the present invention.

FIG. 15 is a block diagram of a hearing aid system 201 having a system bus 202 coupled to an external system bus 225 via a wired external interface 227a. The various components, not all of which may be present in a specific application, are shown as interconnected by the system bus 202. The system bus 202 can be according to any of the embodiments shown and described in connection with the system bus 2.

The system bus 202 is connected to a microprocessor 204 which may be powered by a battery or other power supply source (not shown). A system clock 207 is connected to the microprocessor 204. A weak pull-down device 228 is shown. In alternate embodiments, the device 228 is a high-value resistor, a high-value pull-up resistor, or a weak pull-down or pull-up current source.

The hearing aid system 201 includes at least one transducer for converting input acoustical audio signals to audio electrical signals. FIG. 15 illustrates a pair of digital microphones 210a, 210b operating together as a directional microphone 210. For digital operation, the audio output of the digital directional microphone 210 is carried within an audio/data channel as a digital electrical audio signal over the system bus 202. The microprocessor 204 processes the digital electrical audio signal into a processed digital electrical audio signal, which is carried to a receiver or speaker 212.

Alternatively, for analog operation, an optional codec 220 is shown which interfaces to a direct input/output audio device 221, an analog microphone 222, and an analog speaker 223. Additional slave devices that may be present in the hearing aid system 201 include a telecoil device 214, a wireless RF transceiver 216, and digital control and monitoring devices 218. The control and monitoring devices 218 may include a volume control, a sensitivity control, a mode switch, or any other hearing-aid switches or controls.

The microprocessor 204 is a master component supplying a clock signal and a synchronization signal over the system bus 2 to the peripheral components, 210, 212, 214, 216, 218, 220 and 227a. FIG. 15 shows eight peripheral components connected to the system bus 202, but fewer or more peripheral components may be connected to the system bus 202 in other embodiments. In a specific embodiment, the predetermined addresses or product numbers of the peripheral components are stored in non-volatile memory in or coupled to the microprocessor 204.

The wired external interface 227a includes an internal interface, power electronics, interface electronics, and an external interface. The internal interface interfaces with the system bus 202, and the external interface interfaces with an external system bus 225, which can be coupled to an external HI-programming device, for example. Conventional power and interface electronics enable data to pass between the internal and external interfaces within the wired external interface 227a. In an alternate embodiment, the wired external interface 227a is implemented in the microprocessor 204. The external system bus 225 can be according to any of the embodiments shown and described in connection with the system busses 2 and 202 shown and described above. In a four-wire embodiment of the external system bus 225, the wire carrying the power signal can be at a higher level than in the wire carrying the power signal in a four-wire embodiment of the system bus 2 shown in FIG. 1. The higher voltage is sufficient to allow EEPROM programming, for example. When a programming device of a hearing instrument ("HI") device is connected to the wired external interface 227a, the HI device is completely powered by the external system bus 202.

In either a three- or four-wire embodiment, the functionality clock, data, and ground wires of the external system bus 225 is identical as for the system bus 202, although the signal levels may differ depending on the specification of the wire carrying the power signal. In a four-wire embodiment, the power wire in the external system bus 225 carries the highest voltage needed inside the HI device while it is connected to the external system bus 225. A lower battery-voltage is provided in the wired external interface 227a to power the rest of the HI device. The voltage on the power wire of the external system bus 225 is programmable to support multiple HI devices.

The logic levels and noise margins are related to the external power voltage used on the external system bus 225, and the values for these levels are described in the table shown in FIG. 14. The maximum wiring capacitance to ground is 300 pF.

When connected to the external system bus 225, the operation mode of the HI device should comply with the following:
  a) HI is powered from the external system bus 225;
  b) the external system bus 225 acts as a slave to the (internal) system bus 202; and
  c) by default, the highest internal system-clock frequency is used.

Figure 16:
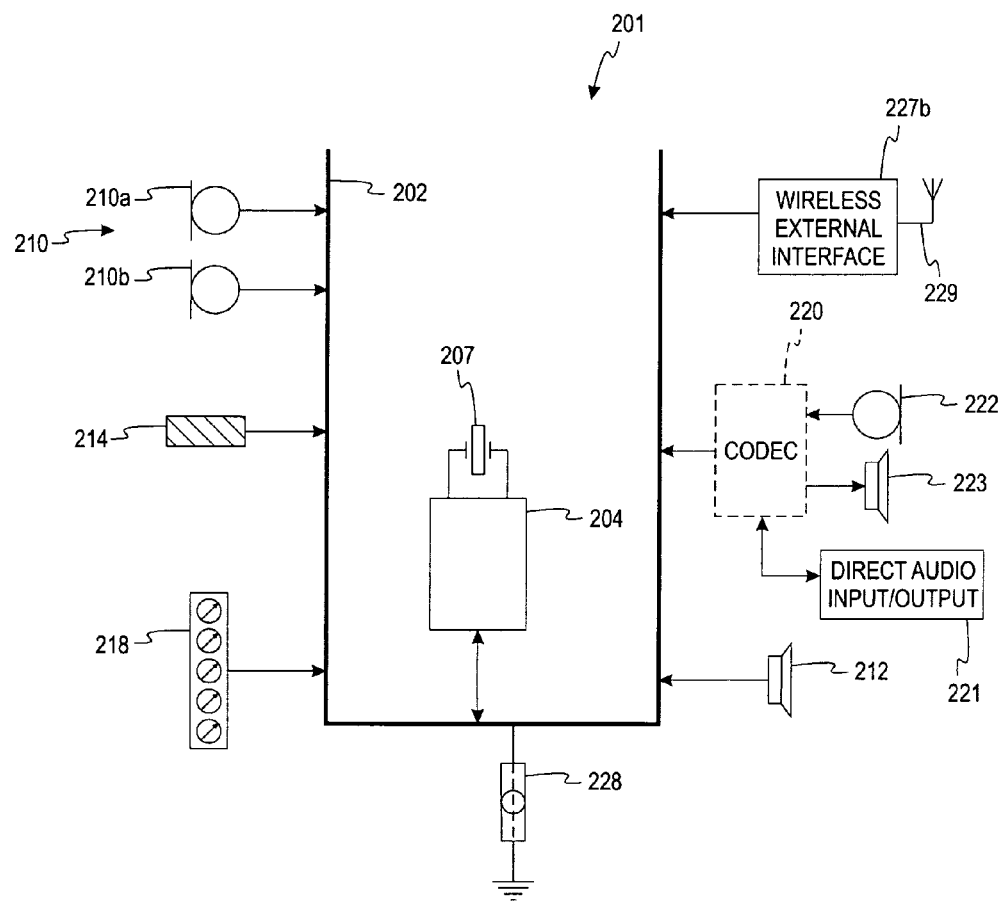
FIG. 16 is a block diagram of a hearing aid instrument system with a wireless external interface according to a specific aspect of the present invention.

FIG. 16 shows an alternate embodiment of the hearing aid 201 shown in FIG. 15, in which a wireless external interface 227b is presented as a slave device on the system bus 202 instead of the wired external interface 227a. The wireless external interface 227b makes the use of other RF interfaces, such as the RF transceiver 216 shown in FIG. 15, redundant. The wireless external interface 227b includes an internal system bus interface, RF electronics, and an antenna 229.

In some applications, such as inter-aural communication, two or more master devices may be needed to communicate with one another. Such applications are feasible and contemplated by the present invention. The interfacing among multiple master devices is handled by the wired or wireless external interface so that the other master devices appear to be slave devices to the system containing a primary master device. In this configuration, the interface supports a reduced command instruction set.

Figure 17:
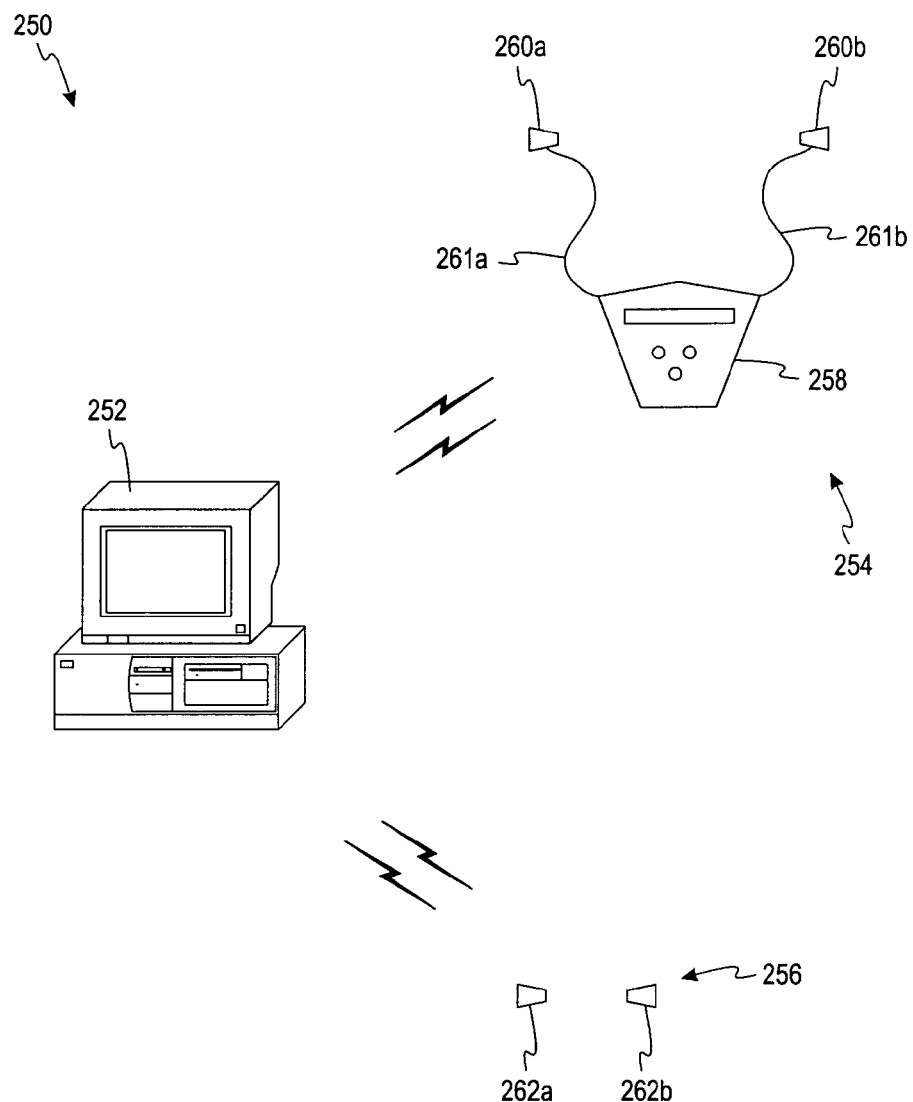
FIG. 17 is a block diagram of a programming system supporting both wired and wireless communication according to a specific aspect of the present invention.

Turning now to FIG. 17, an exemplary block diagram of a hearing instrument ("HI") programming system 250 is shown supporting both wired and wireless programming of hearing instruments via a PC 252. The programming system 250 shown in FIG. 17 generally includes the PC 252, a wireless support device 254, and a pair of hearing instruments or HI devices 256 including a first HI device 262a and a second HI device 262b. The wireless support device 254 includes a control device 258 connected to a first HI device 260a by a first wire assembly 261a, and to a second HI device 260b by a second wire assembly 261b. In an embodiment, the wireless support device 254 can be worn as a necklace, with a decorative piece placed on the control device 258

The PC 252 can simultaneously communicate among two HI devices either directly (such as to the HI devices 262a,b) or via the wireless support device 254 to the HI devices 260a,b. In a preferred but exemplary embodiment, communication from the PC to the wireless support device 254 is based on standard PC-hardware and PC protocols. The wired connections between the control device 258 and the HI devices 260a,b are based on the system bus according to the present invention. The wireless support device 258 is wired to the HI devices 260a,b via four-wire wire assemblies 261a,b connected to respective wired external interfaces.

Wireless communication with the PC 252 is accomplished using an updateable protocol based on IEEE802, such as IEEE802.11b, or any other suitable protocol. The wireless support device 258 may be powered by one or more rechargeable batteries. The HI devices 260a,b are powered from the control device 258 via respective wired external interfaces. The wireless external interface is connected to an RF interface part of the wireless support device 258 or part of the PC 252. The software running on the PC 252 supports bi-directional (full-duplex) audio transport synchronous with control data.

Programming of the HI devices is performed using the system bus configuration shown and described in FIG. 16, with the wired or wireless external interfaces appearing as slaves to the internal system bus. To connect to the bus, the external interface sets its DP-bit (described above) to signal the master to take appropriate action.

The present invention also contemplates programming an HI device using external audio processing. In such embodiments, a full duplex audio link is established between the HI device and a fitting system during the fitting process. The full duplex link is used to perform all of the audio processing during the fitting process, including real-time change of processing parameters inside the PC 252. Processing can be done in a software emulation of the DSP in the HI device or in a set of actual DSPs in an HI device, such as a dongle device. Actual programming of the HI device only needs to be done once, namely, at the end of the fitting process. Advantages to real-time adjustment of processing parameters include:
  a) the fitting process is truly performed in "real time" without requiring multiple programming and listening tests;
  b) the fitting process is faster and more convenient;
  c) listening tests can be performed during the fitting process, using the actual microphone and receiver inside the HI device that the patient is to wear, so that the patient can actually hear the processing parameters change in real time;
  d) increased flexibility allowing for the demonstration of, for example, other DSPs more suitable to the patient's hearing needs;
  e) processing parameters need to be programmed only once, and can be done wirelessly; and
  f) the hardware in the HI device does not have to support high-speed programming.

In the case of an audio device, the system bus according to the present invention has the capability to carry more than one type of formatted digital audio data along with bulk and control data between mutual peripheral devices or between peripheral devices and master devices. Digital audio formats include S/PDIF, AES/EBU, and I2S, for example.

In another embodiment, a low-voltage, low-power device includes low-voltage, low-power components. These components may include a bus interface which is connected to a system bus operating according to a bus protocol. Such components are truly-integrated bus-enabled components as opposed to commercially available bus-enabled systems which include a separate bus interface. The component could be a microphone or a speaker, for example, and the bus interface may be integrated into an ASIC or as a separate integrated circuit, for example. Examples of bus protocols include the protocol according to the present invention, USB, IEEE Firewire, S/PDIF, AES/EBU, and I2S.

In addition to the embodiments described above or in the accompanying claims, several embodiments of the present invention will now be described.

Embodiment A1

A hearing instrument comprising at least one master component, at least one peripheral component and a system bus connected therebetween, the system bus including a plurality of lines, at least one of the lines being a composite line which is adapted to carry more than one digital signal between the at least one master component and the at least one peripheral component in the hearing instrument.

Embodiment A2

The hearing instrument of embodiment A1, wherein the plurality of lines contains the composite line, a first line, and a second line.

Embodiment A3

The hearing instrument of embodiment A1, wherein the composite line is adapted to carry two digital signals selected from the group consisting of a reference signal, a clock signal, a power signal, a synchronizing signal, and a data signal.

Embodiment A4

The hearing instrument of embodiment A1, wherein the composite line is adapted to carry a synchronizing signal and a data signal.

Embodiment A5

The hearing instrument of embodiment A4, wherein the first line is adapted to carry a clock signal and a power signal and the second line is adapted to carry a reference signal.

Embodiment A6

The hearing instrument of embodiment A5, wherein the reference signal is a ground signal.

Embodiment A7

The hearing instrument of embodiment A1, wherein the composite line is adapted to carry a synchronizing signal and a power signal.

Embodiment A8

The hearing instrument of embodiment A1, wherein the plurality of lines contains the composite line, a first line, a second line, and a third line.

Embodiment A9

The hearing instrument of embodiment A8, wherein the composite line is adapted to carry a synchronizing signal and a data signal.

Embodiment A10

The hearing instrument of embodiment A9, wherein the first line is adapted to carry a reference signal, the second line is adapted to carry a power signal, and the third signal is adapted to carry a clock signal.

Embodiment A11

The hearing instrument of embodiment A1, wherein one of the plurality of lines is adapted to carry at least a data signal.

Embodiment A12

The hearing instrument of embodiment A11, wherein the data signal is bidirectional.

Embodiment A13

The hearing instrument of embodiment A11, wherein the composite line is weak-pulled down with tri-state drivers.

Embodiment A14

The hearing instrument of embodiment A11, wherein the data signal is divided into time slots.

Embodiment A15

The hearing instrument of embodiment A11, wherein the data signal is time multiplexed into blocks having a number of frames, each frame having at least one data slot.

Embodiment A16

The hearing instrument of embodiment A15, wherein the number of frames is 32.

Embodiment A17

The hearing instrument of embodiment A15, wherein the at least one data slot is programmable to include a plurality of data slots.

Embodiment A18

The hearing instrument of embodiment A15, wherein the at least one data slot is exactly two data slots.

Embodiment A19

The hearing instrument of embodiment A15, wherein the at least one data slot is exactly three data slots.

Embodiment A20

The hearing instrument of embodiment A15, wherein each of the number of frames includes a control slot carrying control data between the at least one master component and the at least one peripheral component.

Embodiment A21

The hearing instrument of embodiment A15, wherein the data signal carries audio data, a sample of the audio data being transferred via the system bus across at least two frames.

Embodiment A22

The hearing instrument of embodiment A21, wherein the at least two frames are consecutive.

Embodiment A23

The hearing instrument of embodiment A11, wherein the data signal includes control data for controlling a characteristic of the at least one peripheral component.

Embodiment A24

The hearing instrument of embodiment A11, wherein the data signal includes digital audio data.

Embodiment A25

The hearing instrument of embodiment A11, wherein the data signal includes control data adapted to control a characteristic of one of the at least one master component and the at least one peripheral component.

Embodiment A26

The hearing instrument of embodiment A1, wherein the system bus is a low-voltage bus.

Embodiment A27

The hearing instrument of embodiment A26, wherein the voltage of components connected to the system bus is between about 0.7 and about 1.3 volts.

Embodiment A28

The hearing instrument of embodiment A26, wherein the voltage of components connected to the system bus is between about 0.7 and about 2.0 volts.

Embodiment A29

The hearing instrument of embodiment A1, wherein the system bus is a low-power bus.

Embodiment A30

The hearing instrument of embodiment A29, wherein the power consumption of the system bus is between about 30 microwatts and about 1 mW.

Embodiment A31

The hearing instrument of embodiment A1, wherein the at least one master component is a system processor.

Embodiment A32

The hearing instrument of embodiment A31, wherein the processing unit is one of a digital signal processor and an ASIC.

Embodiment A33

The hearing instrument of embodiment A1, wherein the at least one peripheral component is one of a digital microphone, a telecoil, a wireless receiver, a wireless transmitter, a wireless transceiver, a switch, a volume control, a receiver, an analog-to-digital converter, a digital-to-analog converter, a codec, a wired external interface, a wireless external interface.

Embodiment A34

The hearing instrument of embodiment A33, wherein the wired external interface is coupled to an external system bus that includes a plurality of lines, at least one of the lines being a composite line which is adapted to carry more than one digital signal between at least one external master component and at least one external peripheral component, the external system bus being communicatively coupled to the system bus via the wired external interface.

Embodiment A35

The hearing instrument of embodiment A33, wherein the wireless external interface is coupled to an external system bus that includes a plurality of lines, at least one of the lines being a composite line which is adapted to carry more than one digital signal between at least one external master component and at least one external peripheral component, the external system bus being communicatively coupled to the system bus via the wireless external interface.

Embodiment A36

The hearing instrument of embodiment A35 being programmable via the wireless external interface with programming data to cause internal parameters of the hearing instrument to be adjusted.

Embodiment A37

The hearing instrument of embodiment A36, wherein the programming data is communicated according to a protocol complaint with an IEEE802 specification.

Embodiment A38

The hearing instrument of embodiment A35 being programmable via the wireless external interface with audio processing data to cause real-time adjustment of processing parameters.

Embodiment A39

The hearing instrument of embodiment A1, wherein the composite line is coupled to a high-value pull-down or pull-up resistor or a weak pull-down or pull-up current source for ensuring defined logic levels.

Embodiment A40

The hearing instrument of embodiment A39, wherein the high-value resistor is between about 500 kilo-ohms to about 1200 kilo-ohms.

Embodiment A41

The hearing instrument of embodiment A1, wherein the at least one peripheral component is at least four peripheral components.

Embodiment A42

The hearing instrument of embodiment A1, wherein the at least one peripheral component is between four and eight peripheral components.

Embodiment A43

The hearing instrument of embodiment A1, wherein the at least one peripheral component is less than thirty-two components.

Embodiment A44

A hearing instrument system, comprising:
a master component;
at least one peripheral component;
a system bus connecting the at least one master component to the at least one peripheral component, the system bus including four lines, one of the lines being a composite line which is adapted to carry a data signal and a synchronizing signal between the master component and the at least one peripheral component in the hearing instrument.

Embodiment A45

The hearing instrument system of embodiment A44, wherein the at least one master component is a digital signal processor.

Embodiment A46

The hearing instrument system of embodiment A44, wherein the at least one peripheral component is one of a digital microphone, a telecoil, a wireless receiver, a wireless transmitter, a wireless transceiver, a switch, a volume control, a receiver, an analog-to-digital converter, a digital-to-analog converter, a codec, a wired external interface, a wireless external interface.

Embodiment A47

The hearing instrument system of embodiment A44, wherein the four lines include the composite line, a first line adapted to carry a clock signal, a second line adapted to carry a reference signal, and a third line adapted to carry a power signal.

Embodiment A48

The hearing instrument system of embodiment A44, wherein the data signal is bi-directional.

Embodiment A49

The hearing instrument system of embodiment A48, wherein the composite line is weak-pulled down with tri-state drivers.

Embodiment A50

The hearing instrument system of embodiment A48, wherein the data signal is divided into time slots forming blocks having a number of frames carrying at least one data slot.

Embodiment A51

The hearing instrument of embodiment A50, wherein the number of frames is 32.

Embodiment A52

The hearing instrument of embodiment A50, wherein the at least one data slot is programmable to form a plurality of data slots.

Embodiment A53

The hearing instrument of embodiment A50, wherein the system bus is scalable for at least one channel of operation.

Embodiment A54

The hearing instrument of embodiment A53, wherein the at least one channel of operation is between one and eight channels.

Embodiment A55

The hearing instrument of embodiment A53, wherein the at least one channel of operation is programmable by the master component.

Embodiment A56

The hearing instrument system of embodiment A48, wherein the master component and the at least one peripheral component are adapted to transmit and receive data in the data signal.

Embodiment A57

A system bus for use in a portable device, comprising at least two signal-carrying lines, one of the lines being a composite line adapted to carry more than one digital signal between at least one master component and at least one peripheral component in the portable device, the system bus being a low-power, low-voltage bus.

Embodiment A58

The system bus of embodiment A57, wherein the portable device is one of a hearing instrument, a personal digital assistant, and a portable telephone.

Embodiment A59

The system bus of embodiment A57, wherein the system bus is battery-powered.

Embodiment A60

The system bus of embodiment A57, wherein the at least one master component and the at least one peripheral component are battery-powered.

Embodiment A61

The system bus of embodiment A57, wherein the composite line is coupled to a pull-down or pull-up high-value resistor or a pull-down or pull-up current source.

Embodiment A62

The system bus of embodiment A57, wherein the low-voltage is defined as being between about 0.7 and about 2.0 volts.

Embodiment A63

The system bus of embodiment A57, wherein the total power consumption of the portable device is between about 0.2 mW and about 2 W.

Embodiment A64

The system bus of embodiment A57, wherein the at least one peripheral component is a wireless external interface adapted to communicate wirelessly data between the portable device and another portable device.

Embodiment A65

A method of communicating signals in a hearing instrument over a system bus having fewer lines than signals to be carried over the lines, comprising:
providing a plurality of lines in a hearing instrument, one of the lines being a composite line; and
passing a composite signal through the composite line in the hearing instrument, the composite signal including at least two digital signals.

Embodiment A66

The method of embodiment A65, further comprising coupling the composite line to one of a pull-down or pull-up resistor or a pull-down or pull-up current source.

Embodiment A67

The method of embodiment A65, further comprising connecting one of the plurality of lines to a battery.

Embodiment A68

The method of embodiment A65, wherein the battery has a voltage output of between about 0.7 volts and about 2.0 volts.

Embodiment A69

The method of embodiment A65, wherein the composite signal is composed of a data signal and one of a synchronizing signal, a clock signal, and a power signal.

Embodiment A70

The method of embodiment A65, wherein the composite signal includes a third digital signal.

Embodiment A71

The method of embodiment A70, wherein the composite line carries a power signal, a clock signal, and a synchronizing signal.

Embodiment A72

The method of embodiment A70, wherein the composite line carries a clock signal, a data signal, and a synchronizing signal.

Embodiment A73

A method of connecting components in a hearing instrument via a system bus, comprising:
providing a system bus having a plurality of lines, one of the lines being a composite line adapted to carry at least two digital signals; and
connecting the system bus to a master component and at least one peripheral component.

Embodiment A74

The method of embodiment A73, further comprising coupling the composite line to one of a pull-up resistor, a pull-down resistor, a pull-up current source, and a pull-down current source for ensuring defined logic levels, one of the at least two digital signals carried by the composite line being a data signal.

Embodiment A75

The method of embodiment A73, wherein the master component and the at least one peripheral component are adapted to transmit information on and to receive information from the composite line.

Embodiment A76

A method of carrying a number of signals on a fewer number of wires in a low-power, low-voltage system bus, comprising:
providing a plurality of wires to form a low-power, low-voltage system bus;
adapting a composite one of the plurality of wires to carry more than one digital signal; and
coupling the composite wire to one of a high-value resistor and a current source.

Embodiment A77

The method of embodiment A76, wherein the low-power is defined as being less than about 50 mW.

Embodiment A78

The method of embodiment A76, wherein the low-voltage is defined as being less than about 2.0 volts.

Embodiment A79

The method of embodiment A76, further comprising connecting one of the plurality of wires to a low-voltage battery.

Embodiment A80

The method of embodiment A76, wherein the high-value resistor is between about 500 kilo-ohms and about 1200 kilo-ohms.

Embodiment A81

The method of embodiment A76, further comprising connecting the system bus between a master processor and at least one peripheral component.

Embodiment A82

The method of embodiment A81, further comprising storing peripheral data in a memory of the at least one peripheral component and adapting the master processor to receive the peripheral data over the system bus.

Embodiment A83

A listening device, comprising:
a plurality of peripheral components including at least a microphone and a receiver, the microphone transducing an incoming acoustical audio signal to an electrical audio signal, the receiver transducing a processed electrical audio signal to an output acoustical audio signal for broadcasting to a user of the listening device;
a system bus connecting the system processor with each of the plurality of peripherals, the system bus including a plurality of lines, one of the plurality of lines being a composite line for carrying two digital signals between the system processor and the plurality of peripherals.

Embodiment A84

The listening device of embodiment A83, wherein one of the plurality of peripherals is a telecoil for transducing a magnetic signal to a digital input electrical audio signal.

Embodiment A85

The listening device of embodiment A83, wherein the microphone and the receiver are digital.

Embodiment A86

The listening device of embodiment A83, wherein the microphone and the receiver are analog components and are coupled to a A-D converter.

Embodiment A87

The listening device of embodiment A83, wherein one of the signals is a data signal, the system processor sending control data and raw data in the data signal to the plurality of components.

Embodiment A88

The listening device of embodiment A87, wherein the raw data is audio data.

Embodiment A89

The listening device of embodiment A88, wherein the data signal is bidirectional.

Embodiment A90

A listening device, comprising:
a plurality of peripheral components including at least a microphone and a speaker, the microphone transducing an input acoustical audio signals to an input electrical audio signals, the speaker transducing an output electrical audio signals to an output acoustical audio signals for broadcasting to a user of the listening device;
a system processor for converting the input electrical audio signals to the output electrical audio signals; and
a system bus connecting the system processor with each of the plurality of peripherals, the system bus including a plurality of lines, one of the plurality of lines being a data line, the input electrical audio signals and the output electrical audio signals being selectively transmitted over the data line under the control of the system processor.

Embodiment A91

The listening device of embodiment A90, wherein the data line also transmits a synchronizing signal.

Embodiment A92

The listening device of embodiment A90, wherein the data line also transmits a clock signal.

Embodiment A93

The listening device of embodiment A90, wherein the data line also transmits a power signal.

Embodiment A94

The listening device of embodiment A90, wherein the input electrical audio signals and the output electrical audio signals are time-sliced into blocks of frames carrying at least one data slot, the frames being transmitted over the data line, the at least one data slot being programmable.

Embodiment A95

The listening device of embodiment A94, wherein each of the frames includes control data and audio data corresponding to either the input electrical audio signals or the output electrical audio signals.

Embodiment A96

A system bus for use in a portable device, comprising at least two signal-carrying lines, one of the lines being a composite line adapted to carry a composite digital signal between a first component and a second component in the portable device, the system bus being optimized for use in a low-power, low-voltage environment.

Embodiment A97

The system bus of embodiment A96, wherein the first component is a master component and the second component is a peripheral component.

Embodiment A98

The system bus of embodiment A96, wherein the first component is a first peripheral component and the second component is a second peripheral component.

Embodiment A99

The system bus of embodiment A96, wherein the composite digital signal is composed of a data signal and a synchronizing signal, the data signal being adapted to communicate data to be stored in one of the first component and the second component.

Embodiment A100

The system bus of embodiment A96, wherein the composite line is coupled to one of a high-value resistor and a weak current source.

Embodiment A101

The system bus of embodiment A100, wherein the high-value resistor is a pull-down or pull-up resistor.

Embodiment A102

The system bus of embodiment A100, wherein the weak current source is a pull-down or pull-up current source.

Embodiment A103

The system bus of embodiment A100, wherein the system bus is adapted to achieve a fast response time and low-power consumption using a high-value pull-down or pull-up resistor or current source and tri-state drivers.

Embodiment A104

The system bus of embodiment A96, wherein the composite line is coupled to a high-value pull-down resistor, the composite line being maintained in a weak-pulled down state in response to handing control of the system bus over to another component.

Embodiment A105

The system bus of embodiment A104, wherein each data bit transmitted on the system bus is sampled twice to increase immunity to glitches and noise on the system bus.

Embodiment A106

The system bus of embodiment A105, wherein the composite signal is composed of a data signal and a synchronizing signal, the double-sampling of each data bit permits the synchronizing signal to be transitioned during any rising or falling edge of the system clock of the double-sampling, whereby the double-sampling enables reliable discrimination between the data signal and the synchronizing signal.

Embodiment A107

The system bus of embodiment A104, wherein the bus drivers connected to the composite line are switched to tri-state before handing over the system bus to another component.

Embodiment A108

The system bus of embodiment A96, wherein the first component includes a weak pull-down device that is coupled to the composite line to compensate for current leakage.

Embodiment A109

The system bus of embodiment A108, wherein the second component is a master component implemented in standard hardware using a high-definition language.

Embodiment A110

The system bus of embodiment A96, wherein the composite digital signal includes a synchronization signal, the synchronization signal including a first data bit composed of two sampled values and a second non-consecutive data bit composed of two sampled values, the synchronization signal signaling a valid synchronization when the two sampled values of the first data bit are identical and when the two sampled values of the second data bit are identical.

Embodiment A111

The system bus of embodiment A96, wherein the composite line is weak-pulled down with tri-state drivers, the tri-state drivers enabling the first component and the second component to communicate information on the composite line.

Embodiment A112

The system bus of embodiment A96, wherein the composite line is coupled to a high-value pull-down or pull-up resistor or current source with tri-state drivers.

Embodiment A113

The system bus of embodiment A112, wherein the composite line is actively charged or discharged by the tri-state drivers to the same voltage that the resistor or current source is pulling towards before switching the drivers to tri-state.

Embodiment A114

The system bus of embodiment A96, wherein the system bus is connected to a plurality of components, including the first component and the second component, each of the plurality of components including a weak pull-down or pull-up device so as to minimize the total power consumption of the system bus.

Embodiment A115

The system bus of embodiment A114, wherein each of the plurality of components compensates for its own leakage current.

Embodiment A116

The system bus of embodiment A109, wherein the high-definition language is VHDL.

Embodiment A117

A low-voltage, low-power device including a system bus operating according to a bus protocol, the system bus being optimized for a low-voltage, low-power environment, the device comprising a bus interface in a component of the device adapted to interface with the system bus.

Embodiment A118

The device of embodiment A117, wherein the protocol is one of USB, Firewire, S/PDIF, AES/EBU, and I2S.

Embodiment A119

The device of embodiment A117, wherein the component is one of a microphone and a receiver.

Embodiment A120

A hearing instrument, comprising a transducer having a bus interface, the transducer being connected to a low-voltage, low-power system bus.

Embodiment A121

The hearing instrument of embodiment A120, wherein the transducer is one of a microphone and a speaker.

Embodiment A122

An electro-mechanical or electro-acoustical peripheral device adapted to communicate data across a system bus comprising at least two signal-carrying lines, one of the lines being a composite line adapted to carry more than one digital signal between a master component and the electro-mechanical or electro-acoustical peripheral component.

Embodiment A123

The electro-mechanical or electro-acoustical peripheral device of embodiment A122, wherein said electro-mechanical or electro-acoustical peripheral device is one of an electret-type condenser microphone, a MEMS-based microphone, a receiver, a volume control, a sensitivity control, and a switch.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A portable communication device, comprising:
   a master component in communication with a system bus operating according to a bus protocol; and
   an electro-mechanical or electro-acoustical component disposed within a housing of said portable communication device, said electro-mechanical or electro-acoustical component having a housing in which a digital interface and a bus controller are disposed, said digital interface being in communication with said system bus and with said bus controller, said system bus including at least two signal-carrying lines, one of said lines carrying a digital signal and at least one other intended signal between said master component and said digital interface of said electro-mechanical or electro-acoustical component, said one of said lines being termed a composite line, said bus controller formatting a signal of said component according to said bus protocol for communication over at least said composite line of said system bus.

2. The portable communication device of claim 1, wherein said portable communication device is one of a hearing instrument, a headset, a personal digital assistant, and a portable telephone, said master component being powered by a battery to which one of said at least two signal-carrying lines is coupled.

3. The portable communication device of claim 1, wherein said electro-mechanical or electro-acoustical component is one of an electret-type condenser microphone, a MEMS-based microphone, a receiver, a telecoil, a volume control, a sensitivity control, and a switch.

4. The portable communication device of claim 1, further including a resistor or a current source, wherein said system bus is coupled to said resistor or to said current source.

5. The portable communication device of claim 4, wherein said resistor is a pull-down resistor having a value between substantially 500 kilo-ohms to substantially 1200 kilo-ohms.

6. The portable communication device of claim 1, wherein said composite line carries at least any two of a power signal, a reference signal, a clock signal, a synchronization signal, and a data signal.

7. The portable communication device of claim 1, wherein said digital signal is a data signal that is time multiplexed into blocks having a number of frames, each frame having at least one data slot.

8. The portable communication device of claim 7, wherein each of said number of frames includes a control slot carrying control data between said master component and said electro-mechanical or electro-acoustical component, said data signal carrying audio data, a sample of said audio data being transferred via said system bus across at least two frames.

9. The portable communication device of claim 7, wherein said data signal includes control data for controlling a characteristic of said electro-mechanical or electro-acoustical component.

10. The portable communication device of claim 7, wherein said at least one data slot is programmable by said master component to include a plurality of data slots.

11. The portable communication device of claim 1, wherein the power consumption of said system bus is between substantially 30 microwatts and substantially 1 milliwatt, and components coupled to said system bus, including said master component and said electro-mechanical or electro-acoustical component, operate at a voltage between about 0.7 and about 2.0 volts.

12. The portable communication device of claim 1, wherein the total power consumption of said portable communication device is between substantially 0.2 milliwatts and substantially 2 watts.

13. The portable communication device of claim 1, wherein said master component is one of a digital signal processor and an ASIC.

14. The portable communication device of claim 1, further including a wireless interface coupled to said system bus in said portable communication device, said portable communication device being programmable via said wireless interface with programming data to cause internal parameters of said portable communication device to be adjusted.

15. The portable communication device of claim 1, further including a wireless interface coupled to said system bus in said portable communication device, said portable communication device being programmable via said wireless interface with audio processing data to cause real-time adjustment of processing parameters of said portable communication device.

16. The portable communication device of claim 1, further including a wireless interface adapted to communicate wirelessly data between said portable device and another portable device.

17. The portable communication device of claim 1, wherein each data bit transmitted on said system bus is sampled twice to increase immunity to glitches and noise on said system bus.

18. The portable communication device of claim 17, wherein said composite line carries a data signal and a synchronization signal, said double-sampling of each bit permitting said synchronization signal to be transitioned during any rising or falling edge of the system clock of said double-sampling, whereby said double-sampling enables reliable discrimination between said data signal and said synchronization signal.

19. The portable communication device of claim 1, wherein said digital signal is a synchronization signal that includes a first bit composed of two sampled values and a second non-consecutive data bit composed of two sampled values, said synchronization signal signaling a valid synchronization when the two sampled values of said first data bit are identical and when the two sampled values of said second data bit are identical.

20. The portable communication device of claim 1, further including an external interface, said external interface being coupled to said system bus and to an external system bus that includes at least two signal-carrying lines, one of said lines carrying a digital signal and at least one other intended signal between at least one external master component and an external peripheral device that includes an electro-mechanical or electro-acoustical component, said external system bus being communicatively coupled to said system bus via said external interface.

21. The portable communication device of claim 1, wherein said system bus is actively driven with tri-state buffers.

22. The portable communication device of claim 1, wherein said portable communication device is a hearing instrument, said electro-mechanical or electro-acoustical component being a microphone or a receiver, said digital signal including a digital audio signal.

23. The portable communication device of claim 1, wherein said digital signal is a data signal that includes control data for controlling a characteristic of said electro-mechanical or electro-acoustical component.

24. The portable communication device of claim 1, wherein said digital signal is a data signal that includes digital audio data.

25. The portable communication device of claim 1, further comprising at least two peripheral devices each including an electro-mechanical or electro-acoustical component, said system bus being communicatively coupled to said at least two peripheral devices such that said at least two peripheral devices communicate data over said system bus.

26. The portable communication device of claim 1, wherein the bus controller connects said electro-mechanical or electro-acoustical component to said system bus through at least one tri-state bus driver.

27. The portable communication device of claim 1, wherein the electro-mechanical or electro-acoustical component includes a transducer coupled to an analog-to-digital converter.

28. The portable communication device of claim 27, wherein the transducer is coupled to a pre-amplifier and a decimator.

29. The portable communication device of claim 27, wherein the transducer is a silicon-based MEMS microphone.

30. The portable communication device of claim 1, wherein the digital interface is a physical bus layer.

31. The portable communication device of claim 1, wherein said at least two signal-carrying lines is no more than four lines.

32. A portable communication device, comprising:
at least one peripheral device including an electro-mechanical or electro-acoustical component;
a master component; and
a system bus coupled to said at least one peripheral device, said system bus including at least two signal-carrying lines, one of said lines carrying a digital signal and at least one other electrical signal between said master component and said at least one peripheral device, wherein said digital signal is a synchronization signal that includes a first bit composed of two sampled values and a second non-consecutive data bit composed of two sampled values, said synchronization signal signaling a valid synchronization when the two sampled values of said first data bit are identical and when the two sampled values of said second data bit are identical.

33. A portable communication device, comprising:
at least one peripheral device including an electro-mechanical or electro-acoustical component;
a master component; and
a system bus coupled to said at least one peripheral device, said system bus including at least three wires, one of said wires carrying simultaneously a digital signal and at least one other predetermined signal between said master component and said at least one peripheral device, wherein said digital signal is a synchronization signal that includes a first bit composed of two sampled values and a second non-consecutive data bit composed of two sampled values, said synchronization signal signaling a valid synchronization when the two sampled values of said first data bit are identical and when the two sampled values of said second data bit are identical.

34. The portable communication device of claim 33, wherein the power consumption of said system bus is between substantially 0.2 milliwatts and substantially 2 watts, and components coupled to said system bus, including said master component and said at least one peripheral device, operate at a voltage between substantially 0.7 and substantially 2.0 volts.

* * * * *